(12) United States Patent
Bajaj et al.

(10) Patent No.: US 12,423,637 B2
(45) Date of Patent: Sep. 23, 2025

(54) SYSTEMS AND METHODS FOR PROVIDING DIAGNOSTICS FOR A SUPPLY CHAIN

(71) Applicant: JABIL INC., St. Petersburg, FL (US)

(72) Inventors: Mudit Bajaj, St. Petersburg, FL (US); Andrew Joyner, St. Petersburg, FL (US); Ross Valentine, St. Petersburg, FL (US); Erin Morris, St. Petersburg, FL (US); Paul Docherty, St. Petersburg, FL (US); Ancha Koteswararao, St. Petersburg, FL (US)

(73) Assignee: JABIL INC.

( * ) Notice: Subject to any disclaimer, the term of this patent is extended or adjusted under 35 U.S.C. 154(b) by 0 days.

(21) Appl. No.: 18/210,501

(22) Filed: Jun. 15, 2023

(65) Prior Publication Data
US 2023/0325749 A1 Oct. 12, 2023

Related U.S. Application Data

(63) Continuation of application No. 16/616,380, filed as application No. PCT/US2018/033800 on May 22, (Continued)

(51) Int. Cl.
*G06Q 10/0635* (2023.01)
*G06F 16/904* (2019.01)
(Continued)

(52) U.S. Cl.
CPC ....... *G06Q 10/0635* (2013.01); *G06F 16/904* (2019.01); *G06N 20/00* (2019.01); (Continued)

(58) Field of Classification Search
CPC .......................... G06Q 10/0635; G06Q 10/087
See application file for complete search history.

(56) References Cited

U.S. PATENT DOCUMENTS

| | | | |
|---|---|---|---|
| 5,760,720 | A | 6/1998 | Nolan |
| 6,175,727 | B1 | 1/2001 | Mostov |

(Continued)

FOREIGN PATENT DOCUMENTS

| | | |
|---|---|---|
| CN | 101512456 | 8/2009 |
| CN | 101662212 | 3/2010 |

OTHER PUBLICATIONS

Arief Adhitya et al, A model-based rescheduling framework for managing abnormal supply chain events, Computers and Chemical Engineering 31 (2007) 496-518 (Year: 2007).

(Continued)

*Primary Examiner* — Andre D Boyce
(74) *Attorney, Agent, or Firm* — Riverside Law LLP

(57) ABSTRACT

Apparatus, system and method for supply chain management (SCM) system processing. A SCM operating platform is operatively coupled to SCM modules for collecting, storing, distributing and processing SCM data to determine statistical opportunities and risk in a SCM hierarchy. SCM risk processing may be utilized to determine risk values that are dependent upon SCM attributes. Multiple SCM risk processing results may be produced for further drill-down by a user. SCM network nodes, their relation and status may further be produced for fast and efficient status determination.

19 Claims, 29 Drawing Sheets

Related U.S. Application Data 2018, now abandoned, said application No. 16/616, 380 is a continuation-in-part of application No. 14/523,642, filed on Oct. 24, 2014.

(60) Provisional application No. 62/509,653, filed on May 22, 2017, provisional application No. 62/509,675, filed on May 22, 2017, provisional application No. 62/509,665, filed on May 22, 2017, provisional application No. 62/509,660, filed on May 22, 2017, provisional application No. 62/509,669, filed on May 22, 2017, provisional application No. 61/896,251, filed on Oct. 28, 2013, provisional application No. 61/895,665, filed on Oct. 25, 2013, provisional application No. 61/896,636, filed on Oct. 28, 2013.

(51) Int. Cl.
| | |
|---|---|
| *G06N 20/00* | (2019.01) |
| *G06Q 10/0631* | (2023.01) |
| *G06Q 10/0637* | (2023.01) |
| *G06Q 10/08* | (2024.01) |
| *G06Q 10/087* | (2023.01) |

(52) U.S. Cl.
CPC ........... *G06Q 10/063114* (2013.01); *G06Q 10/06315* (2013.01); *G06Q 10/0637* (2013.01); *G06Q 10/06375* (2013.01); *G06Q 10/08* (2013.01); *G06Q 10/087* (2013.01)

(56) References Cited

U.S. PATENT DOCUMENTS

| | | | |
|---|---|---|---|
| 6,424,129 B1 | 7/2002 | Lethellier | |
| 6,567,822 B1 | 5/2003 | Cudahy | |
| 6,791,304 B2 | 9/2004 | Pearce | |
| 6,894,466 B2 | 5/2005 | Huang | |
| 6,970,841 B1 | 11/2005 | Cheng | |
| 7,019,581 B1 | 3/2006 | Potanin | |
| 7,154,381 B2 | 12/2006 | Lang | |
| 7,206,343 B2 | 4/2007 | Pearce | |
| 7,225,981 B2 | 6/2007 | Jongebloed | |
| 7,262,628 B2 | 8/2007 | Southwell | |
| 7,301,317 B1 | 11/2007 | Mattingly | |
| 7,417,413 B2 | 8/2008 | Noma | |
| 7,492,132 B2 | 2/2009 | Kuroiwa | |
| 7,536,311 B1 | 5/2009 | Kralik | |
| 7,664,674 B2 | 2/2010 | Negron | |
| 7,982,446 B2 | 7/2011 | Noon | |
| 8,032,552 B2 | 10/2011 | Davies | |
| 8,160,903 B2 | 4/2012 | Schuver | |
| 8,160,908 B2 | 4/2012 | Bennett | |
| 8,228,049 B2 | 7/2012 | Qiu | |
| 8,233,299 B2 | 7/2012 | Ahmad | |
| 8,237,423 B2 | 8/2012 | Heineman | |
| 8,645,332 B1 | 2/2014 | Cohen | |
| 9,032,533 B2 | 5/2015 | Bennett | |
| 9,229,674 B2 | 1/2016 | Tapley | |
| 9,412,117 B2 | 8/2016 | Hansen | |
| 9,489,417 B2 | 11/2016 | Jose | |
| 9,547,409 B2 | 1/2017 | Huang | |
| 10,026,049 B2 | 7/2018 | Asenjo | |
| 10,552,714 B2 | 2/2020 | Kiapour | |
| 10,726,389 B2 | 7/2020 | Undernehr | |
| 10,803,414 B2 | 10/2020 | Shenoy | |
| 11,810,044 B1* | 11/2023 | Singh | H04L 67/025 |
| 11,816,619 B2 | 11/2023 | Rubin | |
| 2002/0143669 A1 | 10/2002 | Scheer | |
| 2002/0169657 A1 | 11/2002 | Singh | |
| 2002/0188486 A1 | 12/2002 | Gil | |
| 2002/0188496 A1 | 12/2002 | Feldman | |
| 2003/0014287 A1 | 1/2003 | Williams | |
| 2003/0014379 A1 | 1/2003 | Saias | |
| 2003/0018546 A1 | 1/2003 | Ayala | |
| 2003/0033179 A1 | 2/2003 | Katz | |
| 2003/0037063 A1 | 2/2003 | Schwartz | |
| 2003/0208417 A1 | 11/2003 | Heinrichs | |
| 2004/0064382 A1 | 4/2004 | Negron | |
| 2004/0186794 A1 | 9/2004 | Renz | |
| 2005/0021425 A1 | 1/2005 | Casey | |
| 2005/0044431 A1 | 2/2005 | Lang | |
| 2005/0049892 A1 | 3/2005 | Miller | |
| 2005/0154653 A1 | 7/2005 | Jongebloed | |
| 2005/0209732 A1* | 9/2005 | Audimoolam | G06Q 10/06 700/216 |
| 2006/0085323 A1 | 4/2006 | Matty | |
| 2007/0043602 A1 | 2/2007 | Ettl | |
| 2007/0200538 A1 | 8/2007 | Tang | |
| 2008/0091774 A1 | 4/2008 | Taylor | |
| 2008/0162238 A1 | 7/2008 | Subbu | |
| 2008/0203985 A1 | 8/2008 | Dong | |
| 2010/0001330 A1 | 1/2010 | Chien | |
| 2010/0013307 A1 | 1/2010 | Heineman | |
| 2010/0017267 A1 | 1/2010 | Negron | |
| 2010/0033145 A1 | 2/2010 | Tseng | |
| 2010/0057646 A1 | 3/2010 | Martin | |
| 2010/0094674 A1 | 4/2010 | Marriner | |
| 2010/0198631 A1 | 8/2010 | Edwards | |
| 2010/0238060 A1 | 9/2010 | Nien | |
| 2010/0274684 A1 | 10/2010 | Melander | |
| 2011/0208560 A1 | 8/2011 | Najmi | |
| 2012/0046989 A1 | 2/2012 | Baikalov | |
| 2012/0166247 A1 | 6/2012 | Tu | |
| 2012/0232955 A1 | 9/2012 | Riazzi | |
| 2013/0041713 A1 | 2/2013 | Henrich | |
| 2013/0041714 A1 | 2/2013 | Henrich | |
| 2013/0060598 A1 | 3/2013 | Dudley | |
| 2013/0080823 A1 | 3/2013 | Roth | |
| 2013/0159512 A1 | 6/2013 | Groves | |
| 2013/0226652 A1 | 8/2013 | Bilello | |
| 2014/0018951 A1 | 1/2014 | Linton | |
| 2014/0019471 A1 | 1/2014 | Linton | |
| 2014/0058775 A1 | 2/2014 | Siig | |
| 2014/0074668 A1 | 3/2014 | Gomez | |
| 2014/0200953 A1 | 7/2014 | Mun | |
| 2014/0222522 A1 | 8/2014 | Chait | |
| 2014/0278713 A1 | 9/2014 | Zivelin | |
| 2014/0278728 A1 | 9/2014 | Hollenbach | |
| 2014/0344007 A1 | 11/2014 | Shende | |
| 2015/0088596 A1 | 3/2015 | Civil | |
| 2015/0120373 A1 | 4/2015 | Bajaj | |
| 2015/0222183 A1 | 8/2015 | Karlsson | |
| 2015/0248536 A1 | 9/2015 | Tawil | |
| 2015/0254589 A1 | 9/2015 | Saxena | |
| 2015/0363730 A1 | 12/2015 | Crane, Jr. | |
| 2016/0170974 A1 | 6/2016 | Martinez Corria | |
| 2016/0217406 A1 | 7/2016 | Najmi | |
| 2016/0337441 A1 | 11/2016 | Bloomquist | |
| 2017/0017909 A1 | 1/2017 | Srinivasan | |
| 2017/0098186 A1 | 4/2017 | Song | |
| 2017/0124495 A1 | 5/2017 | Saxena | |
| 2017/0154286 A1 | 6/2017 | Karuppasamy | |
| 2017/0193411 A1 | 7/2017 | Vashistha | |
| 2017/0262764 A1 | 9/2017 | Karuppasamy | |
| 2017/0330115 A1 | 11/2017 | Hankins | |
| 2017/0344920 A1 | 11/2017 | Shenoy | |
| 2018/0025459 A1 | 1/2018 | Shapiro | |
| 2018/0053114 A1 | 2/2018 | Adjaoute | |
| 2018/0197128 A1 | 7/2018 | Carstens | |
| 2019/0107815 A1 | 4/2019 | Miller | |
| 2019/0188732 A1 | 6/2019 | Hill | |
| 2019/0303821 A1 | 10/2019 | Khomich | |
| 2020/0097869 A1 | 3/2020 | Bajaj | |
| 2022/0121884 A1 | 4/2022 | Zadeh | |
| 2022/0335375 A1 | 10/2022 | Shekhar | |
| 2022/0343244 A1 | 10/2022 | Yesudas | |

OTHER PUBLICATIONS

International Preliminary Report on Patentability for PCT/US2018/033803, dated Nov. 26, 2019, 5 pages.

(56) References Cited

OTHER PUBLICATIONS

International Preliminary Report on Patentability, dated Nov. 26, 2019 for PCT/US2018/033804, 6 pages.
International Search Report and Written Opinion issued on Jan. 14, 2019 in PCT/US2018/033804, 9 pages.
International Search Report for PCT/US2018/033803, dated Oct. 19, 2018, 4 pages.
Korponai, Janos et al., Effect of the Safety Stock on the Probability of Occurrence of the Stock Shortage Procedia Engineering, vol. 182, 2017 (Year: 2017) 7 pages.
McCrea, Bridget, Jabil: Automating supply chain decision making Supply Chain Management Review, Aug. 30, 2016 (Year: 2016) 3 pages.
Morris, Andy, Ultimate Guide to Bubble Charts Netsuite.com, Sep. 30, 2021 (Year: 2021) 8 pages.
Office Action (Final Rejection) dated Dec. 7, 2023 for U.S. Appl. No. 14/523,642 (pp. 1-28).
Oracle Inventory User's Guide Oracle, Sep. 2002 (Year: 2002) 978 pages.
SAS Inventory Optimization 1.3 User's Guide SAS Institute Inc., 2006 (Year: 2006) 140 pages.
Speyerer, Jochen et al, Managing Supply Networks: Symptom Recognition and Diagnostic Analysis with Web Services, Proceedings of the 37th Hawaii International Conference on System Sciences— 2004, pp. 1-10 (Year: 2004).
Trace-Back and Trace-Forward Tools Developed Ad Hoc and Used During the STEC O104:H4 Outbreak 2011 in Germany and Generic Concepts for Future Outbreak Situations; Weiser et al; Mar. 2013 (Year: 2013) 13 pages.
Visualizing and Quantifying Global Supply Chain Risk; Ninan et al; 2014 (Year: 2014) 4 pages.
Written Opinion of the International Searching Authority for PCT/US2018/033803, dated Oct. 19, 2018, 4 pages.
Weiser AA, Gross S, Schielke A, et al. Trace-back and trace-forward tools developed ad hoc and used during the STEC O104:H4 outbreak 2011 in Germany and generic concepts for future outbreak situations. Foodborne Pathog. Dis. 2013; 10(3): 263-269. doi: 10.1089/fpd.2012.1 1296 (Year: 2013).
Office Action (Final Rejection) dated Aug. 1, 2024 for U.S. Appl. No. 18/468,077 (pp. 1-14).
Office Action (Final Rejection) dated Sep. 6, 2024 for U.S. Appl. No. 18/080,533 (pp. 1-36).
Office Action (Final Rejection) dated Oct. 4, 2024 for U.S. Appl. No. 18/469,003 (pp. 1-21).
Office Action (Non-Final Rejection) dated May 14, 2024 for U.S. Appl. No. 14/523,642 (pp. 1-32).
Office Action (Non-Final Rejection) dated Aug. 2, 2024 for U.S. Appl. No. 18/469,003 (pp. 1-17).
Office Action (Non-Final Rejection) dated Nov. 6, 2024 for U.S. Appl. No. 18/468,077 (pp. 1-13).
Grant, Robert, Data Visualization—Charts, Maps and Interactive Graphics CRC Press, 2019 (Year: 2019).
Khan, Muzammil et al., Data and Information Visualization Methods and Interactive Mechanisms: A Survey International Journal of Computer Applications, vol. 34, No. 1, Nov. 2011 (Year: 2011).
Morris, Andy, Ultimate Guide to Bubble Charts NetSuite.com, Sep. 30, 2021 (Year: 2021).
Office Action (Final Rejection) dated Feb. 10, 2025 for U.S. Appl. No. 18/468,077 (pp. 1-14).
Office Action (Non-Final Rejection) dated Jan. 17, 2025 for U.S. Appl. No. 18/080,533 (pp. 1-41).
Office Action (Non-Final Rejection) dated Jan. 31, 2025 for U.S. Appl. No. 18/469,003 (pp. 1-20).
Office Action (Final Rejection) dated Nov. 21, 2024 for U.S. Appl. No. 14/523,642 (pp. 1-15).
Office Action (Final Rejection) dated May 21, 2025 for U.S. Appl. No. 18/469,003 (pp. 1-22).

\* cited by examiner

|  | Design, Eng. & Tech. 315 | Consumer Intelligence 316 |  |
|---|---|---|---|
| Network Optimization 321 | Risk Management 311 | Analytics 312 | Supplier Radar 317 |
| Supply Chain Analytics 322 | Information Visualization 313 | Exception Management 314 | Procurement 318 |
|  | Supply & Demand 319 | Operations 321 |  |

*FIG. 3B*

| ABC Class | MOQ | Multiple | 90-Day Demand | Daily Demand | 7 DOS | New MOQ |
|---|---|---|---|---|---|---|
| A | 10,000 | 1,000 | 76,000 | 844 | 5,911 | 6,000 |

FIG. 5A

| ABC Class | SS Qty. | | 90-Day Demand | Daily Demand | 7 DOS | New SS Qty. |
|---|---|---|---|---|---|---|
| A | 20,000 | | 76,000 | 844 | 5,911 | 5,911 |

FIG. 5B

| ABC Class | SAP LT | SAT LT | 90-Day Demand | Daily Demand | LT Red | Opp $ |
|---|---|---|---|---|---|---|
| A | 20,000 | 70 | 76,000 | 844 | 14 | 11,822 |

FIG. 5C

| ABC Class | SLT | 90-Day Demand | Daily Demand | SLT Red | Opp $ |
|---|---|---|---|---|---|
| A | 10 | 76,000 | 844 | 10 | 8,444 |

*FIG. 5D*

| ABC Class | SOH | 90-Day Demand | Excess OH | Ret. Priv | Opp $ |
|---|---|---|---|---|---|
| A | 150,000 | 76,000 | 74,000 | YES | 74,000 |

*FIG. 5E*

| ABC Class | SOH | EOQ Demand | EOQ Supply | Ret. Priv | Opp $ |
|---|---|---|---|---|---|
| A | 100,000 | 120,000 | 50,000 | YES | 30,000 |

*FIG. 5F*

| Attribute Name | | Attribute Description | Weight |
|---|---|---|---|
| Alternative Sourcing | 901 | Assesses likelihood a part will cause a supply disruption as a result of there being no sourcing contingency | 34.00% |
| Part Change Risk | 902 | Assesses likelihood a part will cause a supply disruption as a result of part transaction activity (e.g. EC activity) This attribute is derived from the commodity classification | 19.00% |
| Part Manufacturing Risk | 903 | Assesses likelihood a part will cause a supply disruption as a result of a manufacturing process. This attribute is derived from the commodity classification | 9.00% |
| Leed Time | 904 | Assesses likelihood a part will cause a supply disruption as a result of long lead time | 10.00% |
| Spend Leverage | 905 | Assesses likelihood a part will cause a supply disruption as a result of dealing with a supplier we have low leverage with | 19.00% |
| Strategic Status | 906 | Assesses likelihood a part will cause a supply disruption as a result of dealing with a supplier who is non strategic | 0.00% |

*FIG. 9*

Risk Assembly Detail

| Aggregation | Ste | Community Name | Part Description | Part Attributes | | | | Supplier Attributes | | Score |
|---|---|---|---|---|---|---|---|---|---|---|
| | | | | Alt. Sourcing | Part Change | Part Mfg. | Lead Time | Spend Leverage | Strategic Status | Total Risk Score |
| XXXXXXXXXX | US03 | | | 4.13 | 3.77 | 3.42 | 3.15 | 4.70 | 0.00 | 3.92 |
| XXXXXXXXXX | | CABLE | CBL ANALYZER PCB/Q1 RF AMPLIFIER | 3 | 5 | 3 | 4 | 3 | 0 | 3.57 |
| XXXXXXXXXX | | CABLE | CBL SOURCE PCB/INTERLOCK/PCB | 3 | 5 | 3 | 4 | 3 | 0 | 3.57 |
| XXXXXXX | | HARDWARE | WASHER #8 NYLON .75 OD | 3 | 2 | 5 | 4 | 5 | 0 | 3.56 |
| XXXXXXXXX | | CIRCUIT PROTECTION | FUSE IEC 100MA 250V SLO-BL O 15X20MM ROHS | 3 | 5 | 1 | 4 | 3 | 0 | 3.39 |
| XXXXXXXXX | | ANALOG NONSTD | XFMR CURRENT SWITCH 350MA ON NPN ROHS | 3 | 5 | 1 | 2 | 5 | 0 | 3.39 |
| XXXXXXXXX | | DIODE | DIODE ARRAY TVS SMDA 15C 15V BL S OR ROHS | 3 | 5 | 1 | 2 | 5 | 0 | 3.39 |
| XXXXXXXXX | | TRANSISTOR | TSTR NPN DARI GTN2A TIP112 TO220 ROHS | 3 | 5 | 1 | 2 | 5 | 0 | 3.39 |
| XXXXXXXXXX | | DIODE | DIOD TRNZRB SMBJ15A 15V UNIDIR SMR ROHS | 3 | 5 | 3 | 3 | 3 | 0 | 3.39 |
| XXXXXXXXXX | | CABLE | CBL ANALYZER PCB/Q1 RF IN | 3 | 5 | 3 | 3 | 3 | 0 | 3.38 |
| XXXXXXXXXX | | CABLE | CBL ASSY ANALYZER PCB/EM POWER SUPPLY | 3 | 5 | 3 | 3 | 3 | 0 | 3.38 |
| XXXXXXXXXX | | CABLE | CBL ANALYZER PCB/Q3 RF IN | 3 | 5 | 3 | 3 | 3 | 0 | 3.38 |

*FIG. 10*

Risk Part Detail

| Part Name | Commodity | Revenue Impact | Spend | Attribute Name | Attribute Weight | Selection | Score | Weighted Score |
|---|---|---|---|---|---|---|---|---|
| XXXXXXXX | RESISTOR | $70.80 | $2,073,023.03 | | | | | 3.77 |
| | | | | Alternative Sourcing | 34% | Multi AML, Single Source | 3 | 1.02 |
| | | | | Lead Time | 19% | 60.99 | 4 | 0.75 |
| | | | | Part Change Risk | 19% | Electronics | 5 | 0.95 |
| | | | | Part Manufacturing Risk | 9% | Electronics | 1 | 0.09 |
| | | | | Spend | 100% | Spend | 1 | 0.00 |
| | | | | Spend Leverage | 19% | <10% | 5 | 0.95 |

| COMPANY A | | | | | | | DEMO CUST 1 |
|---|---|---|---|---|---|---|---|
| | MY CONTROL TOWERS | NETWORK OPTIMIZATION | SUPPLY CHAIN ANALYTICS | SUPPLIER RADAR | SUPPLY AND DEMAND | | |
| ○ INTERACTIVE MAP | ▼ Campus | ▼ CHIHUAHUA | ▼ Customer Group | ▼ DEMO CUST 1-DIV-9 | | | |
| ☑ STATUS REPORTS | Geographical Impact | Geographical RISC By Manufacturer | | | | | |

Geographical Impact Report

Export to Excel

| Subscriber ▽ | Location ▽ | Manufacturer ▽ | Revenue Impact ▽ | Spend ▽ |
|---|---|---|---|---|
| DEMO CUST 1 | | COMPANY K | 2,900,470.09 | 11,884.74 |
| DEMO CUST 1 | 31200 Chemor, Perak, | COMPANY L | 12,794,163.66 | 3,675.51 |
| DEMO CUST 1 | AGRATE BRIANZA | COMPANY M | 10,197,521.15 | 32,118.69 |
| DEMO CUST 1 | Aichi | COMPANY N | 225,211,683.44 | 48,569.56 |
| DEMO CUST 1 | Allschwill | COMPANY O | 2,192,406.00 | 5,294.27 |
| DEMO CUST 1 | Amagasaki-shi | COMPANY P | 182,014,260.02 | 21,765.64 |
| DEMO CUST 1 | ANG MO KIO | COMPANY Q | 10,197,521.15 | 32,118.69 |
| DEMO CUST 1 | Ansan | COMPANY R | 48,536,252.33 | 61,496.50 |
| DEMO CUST 1 | AOSTA | COMPANY S | 10,197,521.15 | 32,118.69 |
| DEMO CUST 1 | Arc en Barrois | COMPANY T | 10,555,484.76 | 33,458.92 |

Page 1 of 32 ⏵ ⏭ 10 ▼ items per page 1-10 of 315 items

*FIG. 26*

SYSTEMS AND METHODS FOR PROVIDING DIAGNOSTICS FOR A SUPPLY CHAIN

RELATED APPLICATIONS

The present disclosure is a Continuation Application of U.S. application Ser. No. 16/616,380, entitled "SYSTEMS AND METHODS FOR PROVIDING DIAGNOSTICS FOR A SUPPLY CHAIN", filed Nov. 22, 2019, which claims the benefit of priority to International Application No. PCT/US2018/033800, filed May 22, 2018, entitled "Systems and Methods for Providing Diagnostics for a Supply Chain", which claims priority to, is related to, and incorporates by reference, U.S. provisional application No. 62/509,653, filed May 22, 2017, entitled "Systems and Methods for Providing Diagnostics for a Supply Chain"; U.S. provisional application No. 62/509,675, filed May 22, 2017, entitled "Systems and Methods for Assessment and Visualization of Supply Chain Management System Data"; U.S. provisional application No. 62/509,665, filed May 22, 2017, entitled "Systems and Methods for Interfaces to a Supply Chain Management System"; U.S. provisional application No. 62/509,660, filed May 22, 2017, entitled "Systems and Methods for Risk Processing of Supply Chain Management System Data"; U.S. provisional application No. 62/509,669, filed May 22, 2017, entitled "Systems and Methods Optimized Design of a Supply Chain"; U.S. patent application Ser. No. 14/523,642, filed Oct. 24, 2014, to Valentine, et al., entitled "Systems and Methods for Risk Processing and Visualization of Supply Chain Management System Data," which claims priority to U.S. provisional patent application Ser. No. 61/895,636, to Valentine, et al., entitled "Power Supply With Balanced Current Sharing," filed Oct. 28, 2013, U.S. provisional patent application Ser. No. 61/895,665, to Joyner et al., entitled "System and Method for Managing Supply Chain Risk," filed Oct. 25, 2013, and U.S. provisional patent application Ser. No. 61/896,251 to McLellan et al., entitled "Method for Identifying and Presenting Risk Mitigation Opportunities in a Supply Chain," filed Oct. 28, 2013. Each of these is incorporated by reference in their respective entireties herein.

BACKGROUND

Field of the Disclosure

The present disclosure relates to supply chain management (SCM) system processing. More specifically, the present disclosure is related to processing SCM data to reduce cost, optimize data processing and networked communications, improving flexibility, and identifying and mitigating risk in a supply chain. Furthermore, the SCM data may be structured using visualization, analytics and frameworks.

Background of the Disclosure

Supply chains have become increasingly complex, and product companies are faced with numerous challenges such as globalization, shortening product lifecycles, high mix product offerings and countless supply chain procurement models. In addition, challenging economic conditions have placed additional pressure on companies to reduce cost to maximize margin or profit. Focus areas of supply chain-centric companies include reducing cost in the supply chain, maximizing flexibility across the supply chain, and mitigating risks in the supply chain to prevent lost revenue.

Supply chain risk, or the likelihood of supply chain disruptions, is emerging as a key challenge to SCM. The ability to identify which supplier has a greater potential of a disruption is an important first step in managing the frequency and impact of these disruptions that often significantly impact a supply chain. Currently, supply chain risk management approaches seek to measure either supplier attributes or the supply chain structure, where the findings are used to compare suppliers and predict disruption. The results are then used to prepare proper mitigation and response strategies associated with these suppliers. Ideally, such risk management and assessment would be performed during the design of a supply chain for a product or line of products, but design tools and data analysis to allow for such design capabilities are not available in the known art.

Rather than the data- and algorithm-centric supply chain design and risk analysis discussed above, supply chain risk management is instead most often a formal, largely manual process that involves identifying potential losses, understanding the likelihood of potential losses, assigning significance to these losses, and taking steps to proactively prevent these losses. A conventional example of such an approach is the purchasing risk and mitigation (PRAM) methodology developed by the Dow Chemical Company to measure supply chain risks and its impacts. This approach examines supply market risk, supplier risk, organization risk and supply strategy risk as factors for supply chain analysis. Generally speaking, this approach is based on the belief that supplier problems account for the large majority of shutdowns and supply chain failures.

Such conventional systems are needlessly complicated and somewhat disorganized in that multiple layers of classification risks are utilized and, too often, the systems focus mainly on proactively endeavoring to predict disruptive events instead of analyzing and processing underlying root causes and large-scale accumulated data to assess potential disruptions. Further, these conventional systems fail to provide tools to aid in the design of a supply chain at the outset to address potential breakdown and disruption, and they also give little insight or visibility into the actual supply chain over its entirety. Thus, what is needed is an efficient, simplified SCM processing system for aiding in the design of the supply chain, and thereby maximizing opportunities to address potential supply chain risks at the outset and during the life cycle of a supply chain.

Moreover, conventional supply chain management has historically been based on various assumptions that may prove incorrect. By way of example, it has generally been understood that the highest risk in the supply chain resides with suppliers with whom the highest spend occurs—however, the most significant risk in a supply chain may actually reside with small suppliers, particularly if language barriers reside between the supplier and the supply chain manager, or with sole source suppliers, or in relation to suppliers highly likely to be subject to catastrophic events, such as earthquakes, for example. Further, it has typically been the case that increased inventory results in improved delivery performance—however, this, too, may prove to be an incorrect assumption upon analysis of large-scale data over time and across multiple suppliers, at least in that this assumption is true only if an inventory buffer is placed on the correct part or parts, and at the correct service level. Needless to say, such information would be difficult to glean absent automated review of large-scale data over time, and without visibility across an entire supply chain.

Yet further, present supply chain management fails to account for much of the available large-scale data information. By way of example, social media or other third party data sources may be highly indicative of supply chain needs or prospective disruptions. For example, if a provider expresses a desire for increased inventory levels, but social media expresses a largely negative customer sentiment, sales are likely to fall and the increased inventory levels will likely not be necessary. Similarly, large scale data inclusive of third party data may indicate that a supplier previously deemed high risk, such as due to the threat of earthquake, is actually lower risk because that supplier has not been hit with an earthquake over magnitude 5 for that last 20 years, and earthquakes of less than magnitude 5 have only a minimal probability of affecting the supply chain in a certain vertical. As such, large scale data, such as may include social media or other third party data, may complement supply chain management in ways not provided by conventional supply chain management.

By way of further example, conventional systems often deem certain events, such as significant geopolitical events, to pose a very high risk to the supply chain. However, large scale data analysis, such as from the inception of the design of many supply chains in a given vertical and from end-to-end of such supply chains throughout their respective life cycles, may reveal that this supposition has generally not been the case—rather, the supply chain risk may instead be revealed as far more dependent on sole source items and the size and language spoken by certain suppliers than on geopolitical events, by way of non-limiting example.

SUMMARY OF THE DISCLOSURE

Disclosed is an apparatus, system and method for supply chain management (SCM) system processing. A SCM operating platform may be operatively coupled to SCM modules for collecting, storing, distributing and processing SCM data to determine statistical opportunities and risk in a SCM hierarchy. SCM risk processing may be utilized to determine risk values that are dependent upon SCM attributes. Multiple SCM risk processing results may be produced for further drill-down by a user. SCM network nodes, their relation and status may further be produced for fast and efficient status determination.

More particularly, a supply chain management operating platform is disclosed for managing a supply chain that includes a plurality of supply chain nodes. The platform, and its associated system and method, may include a plurality of data inputs capable of receiving primary hardware and software data from at least one third party data source and at least one supply chain node upon indication by at least one processor. The platform and its associated system and method may also include a plurality of rules stored in at least one memory element associated with at least one processor and capable of performing operations on the primary hardware and software data to produce secondary data upon direction from the processor(s). The platform and its associated system and method may also include a plurality of data outputs capable of at least one of interfacing with a plurality of application inputs, and capable of providing the secondary data, comprised of at least one of supply chain risk data, supply chain management data, and supply chain analytics, to ones of the plurality of application inputs for interfacing to a user; and interfacing with the user to provide the secondary data comprised of at least one of supply chain risk data, supply chain management data, and supply chain analytics.

The disclosed embodiments may additionally include a supply chain platform for providing diagnostics related to a supply chain comprising a plurality of supply chain nodes. The platform may include a plurality of data inputs capable of receiving primary hardware and software data from at least one second supply chain accessible over a computer network, and capable of receiving diagnostic data regarding at least one of the plurality of supply chain nodes, upon indication by at least one processor; a plurality of rules stored in at least one memory element associated with the at least one processor and capable of performing comparative operations on the primary hardware data, the software data, and the diagnostic data to produce secondary data upon direction from the at least one processor; and a plurality of data outputs. The data outputs may be capable of providing to a user interface of the secondary data comprised of at least a comparative optimization of the at least one of the plurality of supply chain nodes based on the comparative application of at least ones of the plurality of rules; and providing the secondary data to a user via the user interface.

BRIEF DESCRIPTION OF THE DRAWINGS

The present invention is illustrated by way of example and not limitation in the figures of the accompanying drawings, in which like references indicate similar elements and in which:

FIG. 3B illustrates the SCM platform utilizing extended plug-in applications/modules under another exemplary embodiment;

FIGS. 5A-5F illustrate logical processing outcomes for a variety of exemplary embodiments;

FIG. 9 illustrates an exemplary data table providing for attribute naming, attribute description and applicable weight attribution for SCM processing;

FIG. 10 illustrates an exemplary risk assembly detail for commodities/parts, wherein part and supplier attributes are processed to determine an overall risk;

FIG. 11 illustrates an exemplary risk part detail for commodities/parts, wherein various attributes are processed together with attribute weights and selection scores to calculate a weighted risk score;

FIG. 13 illustrates an exemplary interface for a network optimizer under one exemplary embodiment;

FIG. 26 illustrates an exemplary interface.

DETAILED DESCRIPTION

Figure 1:
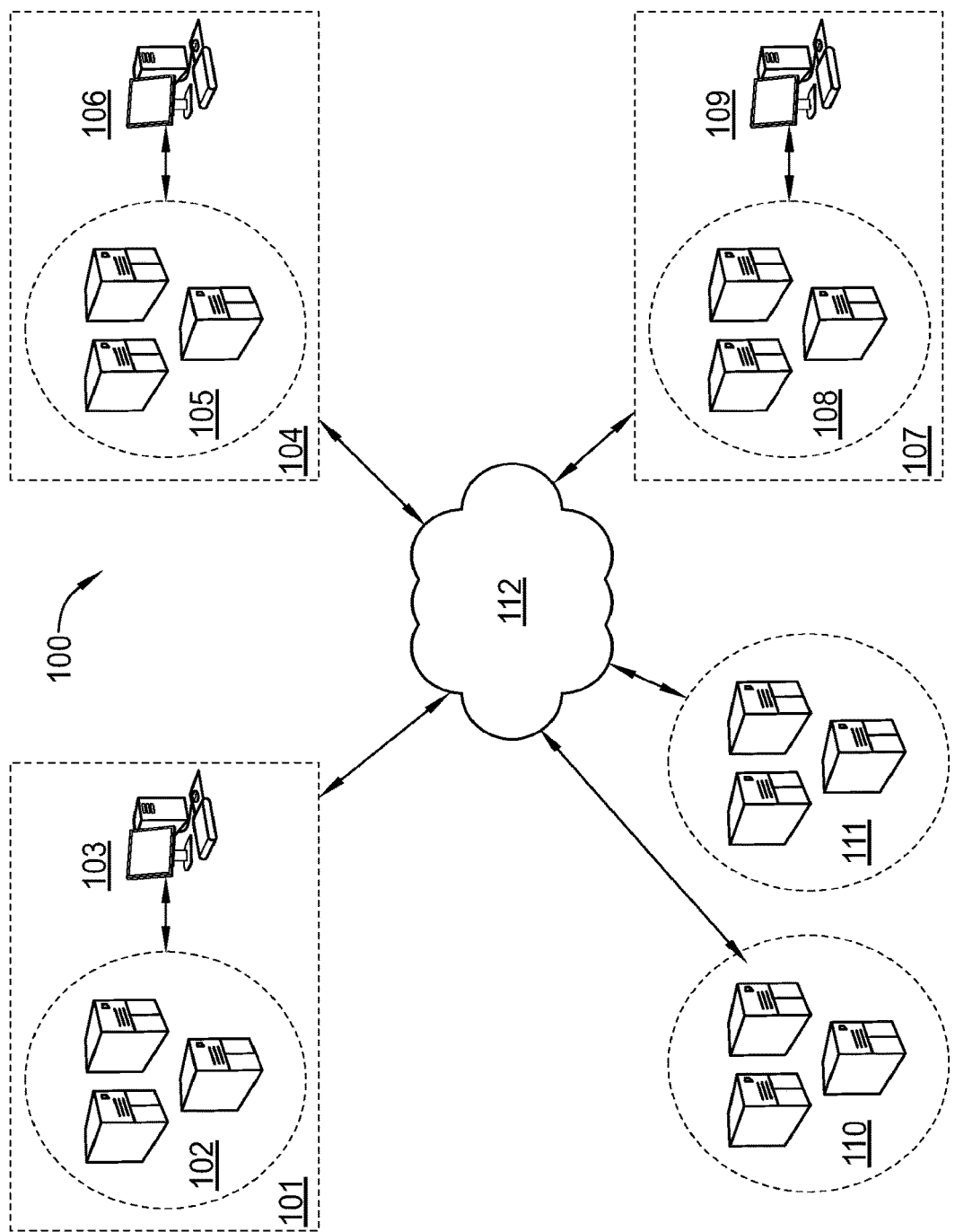
FIG. 1 illustrates a computer system for transmitting and processing data, and particularly supply chain management (SCM) data under an exemplary embodiment.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Computer-implemented platforms, engines, systems and methods of use are disclosed herein that provide networked access to a plurality of types of digital content, including but not limited to video, image, text, audio, metadata, algorithms, interactive and document content, and that track, deliver, manipulate, transform and report the accessed content. Described embodiments of these platforms, engines, systems and methods are intended to be exemplary and not limiting. As such, it is contemplated that the herein described systems and methods may be adapted to provide many types of server and cloud-based valuations, interactions, data exchanges, and the like, and may be extended to provide enhancements and/or additions to the exemplary platforms, engines, systems and methods described. The disclosure is thus intended to include all such extensions.

Furthermore, it will be understood that the terms "module" or "engine", as used herein does not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C #, Java, Actionscript, Objective-C, Javascript, CSS, XML, etc.).

Turning to FIG. 1, an exemplary computer system is disclosed in an embodiment. In this example, computer system 100 is configured as a SCM processing system, wherein primary processing node 101 is configured to contain an SCM platform for processing data from other nodes (104, 107), which will be described in further detail below. In one embodiment, primary node 101 comprises one or more servers 102 operatively coupled to one or more terminals 103. Primary node 101 is communicatively coupled to network 112, which in turn is operatively coupled to supply chain nodes 104, 107. Nodes 104, 107 may be configured as standalone nodes or, preferably, as network nodes, where each node 104, 107 comprises network servers 105, 108 and terminals 106, 109, respectively.

As will be explained in the embodiments discussed below, nodes 104, 107 may be configured as assembly nodes, part nodes, supplier nodes, manufacturer nodes and/or any other suitable supply chain node. Each of these nodes may be configured to collect, store, and process relevant supply chain-related data and transmit the SCM data to primary node 101 via network 112. Primary node 101 may further be communicatively coupled to one or more data services 110, 111 which may be associated with governmental, monetary, economic, meteorological, etc., data services. Services 110, 111 may be third-party services configured to provide general environmental data relating to SCM, such as interest rate data, tax/tariff data, weather data, trade data, currency exchange data, and the like, to further assist in SCM processing. Primary node 101 may be "spread" across multiple nodes, rather than comprising a single node, may access data at any one or more of a plurality of layers from nodes 104, 107, and may be capable of applying a selectable one or more algorithms, applications, calculations, or reporting in relation to any one or more data layers from nodes 104, 107.

Figure 2:
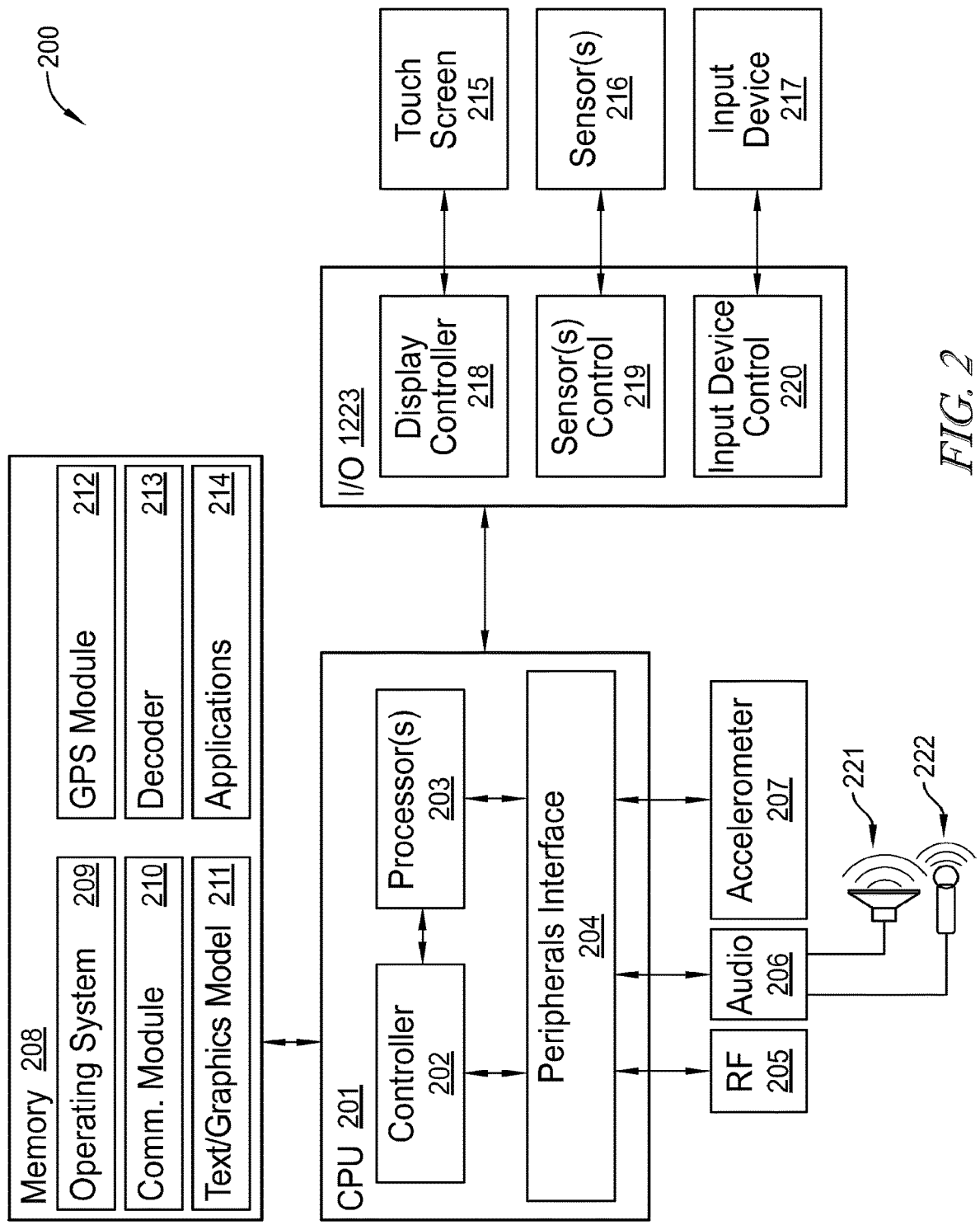
FIG. 2 illustrates an exemplary processing device suitable for use in the embodiment of FIG. 1 for processing and presenting SCM data.

FIG. 2 is an exemplary embodiment of a computing device 200 which may function as a computer terminal (e.g., 103), and may be a desktop computer, laptop, tablet computer, smart phone, or the like. Actual devices may include greater or fewer components and/or modules than those explicitly depicted in FIG. 2. Device 200 may include a central processing unit (CPU) 201 (which may include one or more computer readable storage mediums), a memory controller 202, one or more processors 203, a peripherals interface 1204, RF circuitry 205, audio circuitry 206, a speaker 221, a microphone 222, and an input/output (I/O) subsystem 223 having display controller 218, control circuitry for one or more sensors 216 and input device control 214. These components may communicate over one or more communication buses or signal lines in device 200. It should be appreciated that device 200 is only one example of a multifunction device 200, and that device 200 may have more or fewer components than shown, may combine two or more components, or a may have a different configuration or arrangement of the components. The various components shown in FIG. 2 may be implemented in hardware or a combination of hardware and tangibly-embodied, non-transitory software, including one or more signal processing and/or application specific integrated circuits.

Data communication with device 200 may occur via a direct wired link or data communication through wireless, such as RF, interface 205, or through any other data interface allowing for the receipt of data in digital form. Decoder 213 is capable of providing data decoding or transcoding capabilities for received media, and may also be enabled to provide encoding capabilities as well, depending on the needs of the designer. Memory 208 may also include high-speed random access memory (RAM) and may also include non-volatile memory, such as one or more magnetic disk storage devices, flash memory devices, or other non-volatile solid-state memory devices. Access to memory 208 by other components of the device 200, such as processor 203, decoder 213 and peripherals interface 204, may be controlled by the memory controller 202. Peripherals interface 204 couples the input and output peripherals of the device to the processor 203 and memory 208. The one or more processors 203 run or execute various software programs and/or sets of instructions stored in memory 208 to perform various functions for the device 200 and to process data including SCM data. In some embodiments, the peripherals interface 204, processor(s) 203, decoder 213 and memory controller 202 may be implemented on a single chip, such as a chip 201. In some other embodiments, they may be implemented on separate chips.

The RF (radio frequency) circuitry 205 receives and sends RF signals, also known as electromagnetic signals. The RF circuitry 205 converts electrical signals to/from electromagnetic signals and communicates with communications networks and other communications devices via the electromagnetic signals. The RF circuitry 205 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 205 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLE, Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 206, speaker 221, and microphone 222 may provide an audio interface between a user and the device 200. Audio circuitry 1206 may receive audio data from the peripherals interface 204, converts the audio data to an electrical signal, and transmits the electrical signal to speaker 221. The speaker 221 converts the electrical signal to human-audible sound waves. Audio circuitry 206 also receives electrical signals converted by the microphone 221 from sound waves, which may include audio. The audio circuitry 206 converts the electrical signal to audio data and transmits the audio data to the peripherals interface 204 for processing. Audio data may be retrieved from and/or transmitted to memory 208 and/or the RF circuitry 205 by peripherals interface 204. In some embodiments, audio circuitry 206 also includes a headset jack for providing an interface between the audio circuitry 206 and removable audio input/output peripherals, such as output-only headphones or a headset with both output (e.g., a headphone for one or both ears) and input (e.g., a microphone).

I/O subsystem 223 couples input/output peripherals on the device 200, such as touch screen 215 and other input/control devices 217, to the peripherals interface 204. The I/O subsystem 223 may include a display controller 218 and one or more input controllers 220 for other input or control devices. The one or more input controllers 220 receive/send electrical signals from/to other input or control devices 217. The other input/control devices 217 may include physical buttons (e.g., push buttons, rocker buttons, etc.), dials, slider switches, joysticks, click wheels, and so forth. In some alternate embodiments, input controller(s) 220 may be coupled to any (or none) of the following: a keyboard, infrared port, USB port, and a pointer device such as a mouse, an up/down button for volume control of the speaker 221 and/or the microphone 222. Touch screen 215 may also be used to implement virtual or soft buttons and one or more soft keyboards.

Touch screen 215 provides an input interface and an output interface between the device and a user. The display controller 218 receives and/or sends electrical signals from/to the touch screen 215. Touch screen 215 displays visual output to the user. The visual output may include graphics, text, icons, video, and any combination thereof (collectively termed "graphics"). In some embodiments, some or all of the visual output may correspond to user-interface objects. Touch screen 215 has a touch-sensitive surface, sensor or set of sensors that accepts input from the user based on haptic and/or tactile contact. Touch screen 215 and display controller 218 (along with any associated modules and/or sets of instructions in memory 208) detect contact (and any movement or breaking of the contact) on the touch screen 215 and converts the detected contact into interaction with user-interface objects (e.g., one or more soft keys, icons, web pages or images) that are displayed on the touch screen. In an exemplary embodiment, a point of contact between a touch screen 215 and the user corresponds to a finger of the user. Touch screen 215 may use LCD (liquid crystal display) technology, or LPD (light emitting polymer display) technology, although other display technologies may be used in other embodiments. Touch screen 215 and display controller 218 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 215.

Device 200 may also include one or more sensors 216 such as optical sensors that comprise charge-coupled device (CCD) or complementary metal-oxide semiconductor (CMOS) phototransistors. The optical sensor may capture still images or video, where the sensor is operated in conjunction with touch screen display 215. Device 200 may also include one or more accelerometers 207, which may be operatively coupled to peripherals interface 1204. Alternately, the accelerometer 207 may be coupled to an input controller 214 in the I/O subsystem 211. The accelerometer is preferably configured to output accelerometer data in the x, y, and z axes.

In one embodiment, the software components stored in memory 208 may include an operating system 209, a communication module 210, a text/graphics module 211, a Global Positioning System (GPS) module 212, audio decoder 1213 and applications 214. Operating system 209 (e.g., Darwin, RTXC, LINUX, UNIX, OS X, Windows, or an embedded operating system such as VxWorks) includes various software components and/or drivers for controlling and managing general system tasks (e.g., memory management, storage device control, power management, etc.) and facilitates communication between various hardware and software components. A SCM processing platform may be integrated as part of operating system 209, or all or some of the disclosed portions of SCM processing may occur within the one or more applications 214. Communication module 210 facilitates communication with other devices over one or more external ports and also includes various software components for handling data received by the RF circuitry 205. An external port (e.g., Universal Serial Bus (USB), Firewire, etc.) may be provided and adapted for coupling directly to other devices or indirectly over a network (e.g., the Internet, wireless LAN, etc.).

Text/graphics module 211 includes various known software components for rendering and displaying graphics on a screen and/or touch screen 215, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 212 determines the location of the device and provides this information for use in various applications. Applications 214 may include various modules, including address books/contact list, email, instant messaging, video conferencing, media player, widgets, instant messaging, camera/image management, and the like. Examples of other applications include word processing applications, JAVA-enabled applications, encryption, digital rights management, voice recognition, and voice replication. Under one embodiment, a 3D object may have access to any or all of features in memory 208.

Figure 3A:
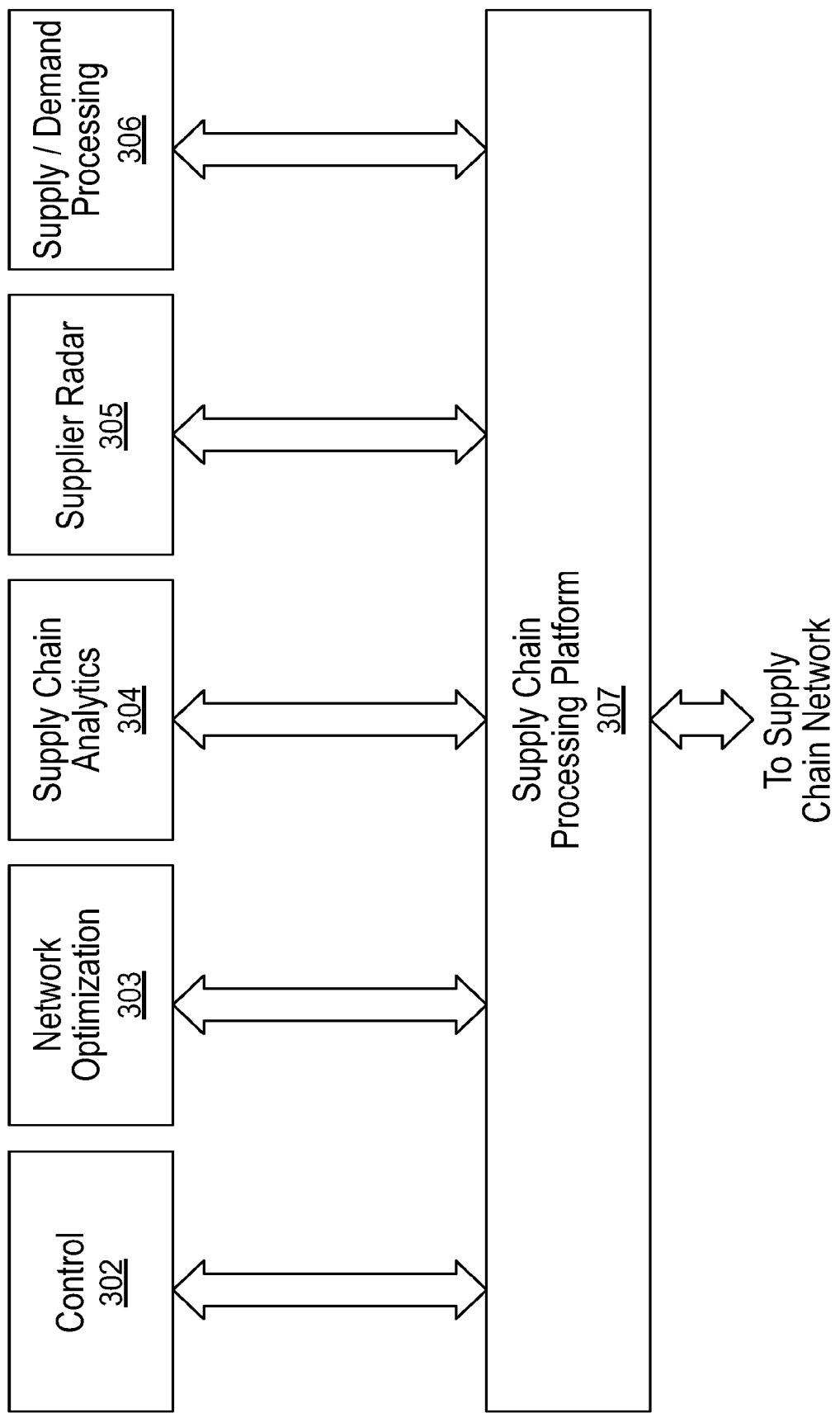
FIG. 3A illustrates an exemplary SCM platform comprising a plurality of plug-in applications/modules, including a control tower module, a network optimization module, a supply chain analytics module, a supplier radar module, and a supply/demand processing module under one embodiment.

Turning to FIG. 3A, a SCM operating platform 307 is disclosed, wherein platform 307 may reside at a primary node 101. Platform 307 may be configured to perform and/or control SCM data processing on data received from external nodes 104, 107 and other data sources 110, 111. Platform 307 is operatively coupled to control module 302, which may be configured to process, diagnose, connect and visualize nodes and their respective geographic locations. Network optimization module 303 processes SCM data to determine which nodes and links meet or exceed predetermined risk thresholds and determines new nodes and/or links that may be added, deleted and/or substituted to establish more efficient network optimization.

Supply chain analytics module 304 may be configured to process incoming supply chain data and forward results to platform 307 for storage, distribution to other modules and/or for further processing. Supplier radar module 305 may be configured to process SCM data to determine supplier geographic impact and/or geographical risk. Supply/demand processing module 306 may be configured to receive and process supply and demand data for determining supply/demand values for various nodes. Each of modules 302-306 may share data between themselves via platform 307. Platform 307 may further be configured to generate visualizations, such as media, charts, graphs, node trees, and the like, for inspection and/or follow-up action by a user.

The platform of FIG. 3A is configured to utilize extensive data across many primary and secondary nodes, advanced analytics, logic and visualization to convert extensive, voluminous unstructured data into an easy-to-action, prioritized diagnosis or list of tasks for improved SCM functionality. One advantageous effect of the platform is that it is effective in identifying actual and potential opportunities of improvement, such as based on analysis of extended historical data of similar or related supply chains. These opportunities are designed to streamline and optimize SCM by generating better SCM terms, models and implementation of optimal parameter settings.

FIG. 3B illustrates, at the primary node 101 of a data exchange diagram, platform 307. In the illustration, platform 307 may provide a plurality of rules and processes, such as the aforementioned analytics, exception management, risk management, and visualization techniques, which may be applied by one or more modules and as discussed further with respect to the diagnostics system detailed below. That is, access to the rules and processes provided by the platform may be available to the aforementioned and below-discussed modules and engines. These applications, also referred to herein as "apps" or modules, may be "thin client", wherein the processes reside entirely within the platform's processing and are accessed by the app; "thick client," wherein the processes reside entirely within the app's processing; or partially thin client, wherein processing and rule application is shared between the app and the platform.

Data inputs for the one of more modules, also referred to in the pertinent art as "data hooks" for "apps," may be associated with the platform 307, and thus may obtain data that is made available by the platform, such as may be obtained from hardware or software outputs provided from nodes 104, 107 and/or sources 110, 111. As illustrated, data may be received in platform modules for risk management 311, analytics 312, information visualization 313 and exception management 314. The data may be provided in the form of network optimization data 321, supply chain analytics data 322, design/engineering/technology data 315, consumer intelligence data 316, supplier data 317, procurement data 318, operations data 321, and supply and demand data 319, by way of non-limiting example. Output data from any given app may be provided through visualization rules unique to the app and within the app, or via the platform, such as within a discreet display aspect for a given app within the platform. Output data from any given app may be provided, such as through visualization rules unique to the app, within the app, or via the platform, such as within a discreet display aspect, such as a drop down, top line, or side line menu, for a given app within the platform.

Moreover, primary data employed by the platform and its associated apps may be atypical of that employed by conventional SCM systems. For example, diagnostics data do/or customer intelligence data may include social media trends and/or third party data feeds in relation to a supply chain, or for all supply chains for similar devices, device lines, or for device lines including or using the same or a similar part and/or for generating the same or a similar product. Secondary data derived from the third party data sources for a device, for example, allows for secondary data to be derived therefrom in relation to inventory stock, the need for alternate sourcing, and the like. For example, a negative overall indication on a device, as indicated by social media data drawn from one or more networked social media locations, would indicate a need for decreased inventory (since a negative consumer impression likely indicates an upcoming decrease in sales), notwithstanding any request by the seller of the device to the contrary. This need for decreased inventory may also dictate modifications for the presently disclosed SCM of the approach to other aspects of the supply chain, such as parts needed across multiple customers, the need to de-risk with multiple sources for parts, the need to ship present inventory in a certain timeframe, and the like. This same data may be mined for other purposes, such as to assess geopolitical, weather, and like events.

The disclosure thus provides a SCM operating platform 307 suitable for receiving base data from the supply chain, and/or from a data store, and/or from third party networked sources, and applying thereto a plurality of rules, algorithms and processes to produce secondary data. This secondary data may be made available within the platform, and/or may be made available to one or more apps, to provide indications to the user based on the applied rules, algorithms and processes. Therefore, the disclosure makes use of significant amounts of data across what may be thousands of supply chain nodes for a single device line to allow for supply chain management, risk management, supply chain monitoring, and supply chain modification, in real time. Moreover, based on the significant data available to the platform, the platform and/or its interfaced apps may "learn" from certain of the data received, such as trend data fail point data, or the like, in order to modify the aforementioned rules, algorithms and processes, in real time and for subsequent application.

Because the apps disclosed make use of the data, rules, algorithms, and processes provided by the platform, any number of different component apps may be provided. Apps may interface with the platform solely to obtain data, and may thereafter apply unique app-based rules, algorithms and processes to the received data; or apps may make use of the data and some or all of the rules, learning algorithms, and processes of the platform and may solely or most significantly provide variations in the visualizations regarding the secondary data produced. Those skilled in the art will thus appreciate, in light of the instant disclosure, that various of the apps and data discussed herein throughout are exemplary only, and thus various other apps, data input, and data output may be provided without departing from the spirit or scope of the invention.

Figure 4:
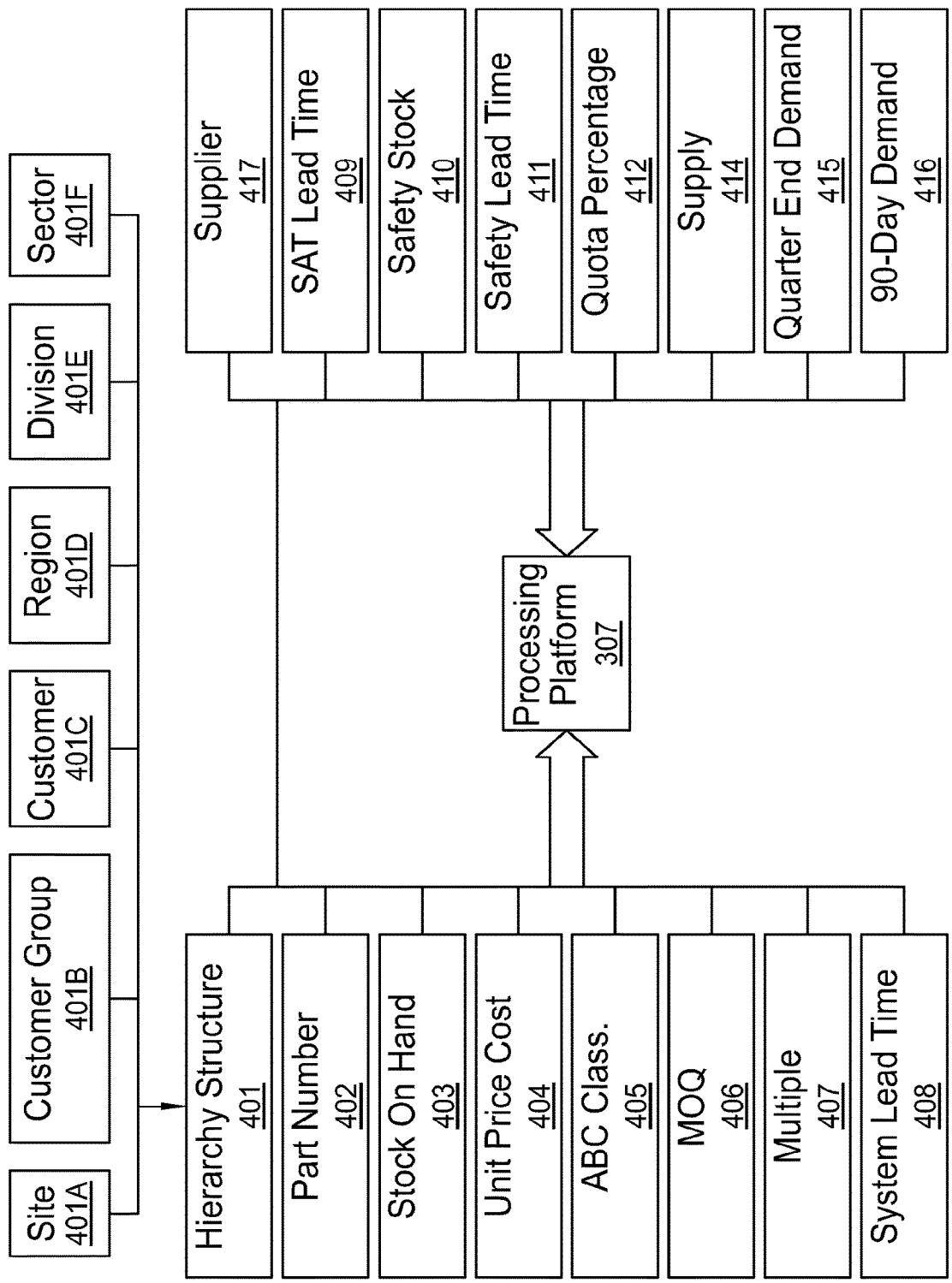
FIG. 4 illustrates exemplary data points and variables modules operatively coupled to a SCM platform under one embodiment.

Turning now to FIG. 4, an embodiment is illustrated for a materials system utilizing the platform 307 of FIG. 3. As SCM data is entered into the system, various data points, variables and loads are entered into the SCM system database for processing and/or distribution to any of the various modules described herein. For each node, a hierarchy structure 401 is determined, which may comprise one or more sites 401A, customer groups 401B, customers 401C, region 401D, division 401E and sector 401E. It is understood by those skilled in the art that the hierarchical structure data points may include additional, other, data points, or may contain fewer data points as the case may be.

Other entries in the embodiment of FIG. 4 include part number 402, which may comprise unique customer material component numbers for each part. Stock on hand 403 may comprise data relating to a current quantity of each component in stock by ownership. For example, quantity data may be segregated among manufacturers, suppliers and customers. It may be understood by those skilled in the art, in light of the instant disclosure, that other entries and segregations are contemplated by the present disclosure. For example, data may also be segregated among types, such as Raw, Work In Process (WIP) and Finished Goods (FG). Data may likewise be segregated by location, such as by Warehouse, Manufacturing Line, Test, Packout, Shipping, etc., or by using any other methodology that may be contemplated by the skilled artisan in view of the discussion provided herein.

Unit price 404 may contain data relating to a cost per component. The cost may be determined via a materials cost, labor cost, or some combination. ABC classification 405 may comprise a classification value of procurement frequency (e.g., every 7 days, 14 days, 28 days, etc.).

ABC Analysis is a term used to define an inventory categorization technique often used in materials management. It is also known as Selective Inventory Control. Policies based on ABC analysis are typically structured such that "A" items are processed under very tight control and accurate records, "B" items are processed under less tightly controlled and good records, and "C" items are processed under the simplest controls possible and minimal records. ABC analysis provides a mechanism for identifying items that will have a significant impact on overall inventory cost, while also providing a mechanism for identifying different categories of stock that will require different management and controls. ABC analysis suggests that inventories of an organization are not of equal value. Thus, the inventory is grouped into three categories (A, B, and C) in order of their estimated importance. Accordingly, "A" items are very important for an organization. Because of the high value of these "A" items, frequent value analysis is required. In addition to that, an organization needs to choose an appropriate order pattern (e.g. "just-in-time") to avoid excess capacity. "B" items are important, but less important than "A" items and more important than "C" items (marginally important). Accordingly, "B" items may be intergroup items. ABC type classifications within the system may help dictate how often materials are procured. By way of non-limiting example, to limit the value of inventory holding and risk, A Classes may be predominantly ordered once per week, B Classes bi-weekly, and C Classes monthly.

MOQ 406 may comprise data relating to a component minimum order quantity for a predetermined time period. This value may be advantageous in determining, for example, a minimum order quantity that must be procured over a predetermined time period. Multiple 407 may comprise data relating to component multiple quantities, such as multiples for demand more than the MOQ value. System lead time 408 may comprise data relating to a system period of time required to release a purchase order prior to receiving components.

Continuing with the example of FIG. 4, supplier 417 may comprise identity data relating to a component source supplier. Sourcing Application Tool (SAT) lead time 409 may comprise a supplier quoted period of time required to release a purchase order prior to receiving components. Safety stock 410 may comprise component and FG buffer stock data relating to a buffer stock quantity that will be excluded from available stock until a shortage status is detected. Safety lead time 411 may comprise component buffer lead time data that may be utilized to recommend a component be delivered in an on-time or earlier-than-expected manner. Quota percentage 412 may comprise data relating to a percentage of supply which should be allocated to each component source supplier. Supply 414 may comprise data relating to supply quantity per component over a predetermined (e.g., 90-day) time period. 90-day demand 416 may comprise data relating to customer demand quantity per component over a 90-day time period. Manufacturers of one or more components may also be tracked separately from suppliers. In some cases, a supplier may act as a distributor by stocking parts from different manufacturers to make them quickly available, but typically at a higher price. Here, supply chain models, such as consigned material and/or vendor managed processes, may be used to assist in identifying and potentially offsetting the extra cost.

Utilizing the exemplary platform illustrated in FIG. 3 and FIG. 4, a number of advantageous SCM processing determinations may be made. In one example, optimal values or actions may be generated based on predetermined logic. For example, a MOQ may be determined to be 10,000 units, while an optimal MOQ quantity is calculated to be 6,000 units. Calculating an area of improvement based on predefined logic, the reduction of current MOQ may be calculated to be 4,000 units (10,000–6,000). Data values calculated for improvement may be determined according to predefined logic, wherein for the exemplary MOQ improvement of 4,000 units, a unit value multiplier of $1 would yield an improvement "opportunity" value of $4,000. As used herein, the phrase "opportunity value" may be used to indicate a particular area of data, such as an item source, a replacement part, an inventory level, or the like, that provides an opportunity to improve an indicated area of the supply chain, such as de-risking, lowering costs, increasing available sources, optimizing inventory levels, or the like.

In addition, one or more opportunity thresholds may be set for each component, and a resulting prioritization may be determined. For example, the system may be configured to only list components with an opportunity value greater than $1,000, where opportunities are sorted in a descending value. Ownership of each component may be assigned, where the system may notify users associated with an ownership entity. Each component may be assigned to multiple users or a single user, and largest opportunities may be identified and notified first. Owners may assign actions, add comments, and potentially escalate SCM data. For example, owners may advise which actions have been taken or escalate data for resolution, etc. When all options and/or system negotiations are completed or exhausted, the system may manually or automatically close a SCM task associated with the data.

In the field of SCM processing, various data points have been used to improve a supply chain. However, the present applicants have identified a number of data areas that are relatively efficient to obtain and process. These data areas are opportunity value areas that have potentially been overlooked by conventional approaches, but have been found to be useful in determining better days in inventory, inventory turn and cash flow, among others. One data area includes MOQ, which provides opportunities to reduce MOQ to an optimal quantity using logic based on order frequency, multiple quantities and demand profiles. Another data area includes safety stock, which provides opportunities to reduce safety stock levels using logic based on order frequency and demand profiles to an optimal safety stock (buffer quantity). Yet another data point includes lead time, which may provide opportunities to reduce procurement lead times with higher system parameters versus an active quotes database.

A still further data point includes safety lead time, which may provide opportunities to reduce safety lead times based on removal of system parameters and/or reducing excessive parameters. Excess inventory data points may also provide opportunities to reduce owned excess inventory based on a rolling measurement and highlight supplier returns privileges. Supply not required data points may also provide opportunity to reduce, divert, cancel, etc., material arriving within a certain period which is not required to meet customer demand. Of course the aforementioned data points are not exclusive and may be combined with other data points discussed in the present disclosure or other data points known in the art.

Thus, for example and as further illustrated with regard to FIGS. 5A-5F, 6-7, and 8A and B, described below, derived secondary data may be provided to indicate, for example, a recommended buffer for an inventoried part. A risk calculation, as discussed in more detail below with regard to FIGS. 9-12, may indicate that a particular part is a high risk part (such as because it is from a small, sole source, foreign supplier). Further, as is often the case with a high risk part, the indication may be that the part is relatively inexpensive in relation to other parts for a given device.

Consequently, the presently disclosed SCM platform 307, notwithstanding a calculation that the optimal procurement time may be 14 days, may derive secondary data from the combinations of the optimal procurement secondary data, the risk associated with the part, and the cost of the part, that a 28 day buffer should be ordered for the part at each of the next two 14 day procurement windows—thereby increasing the buffer for this key, high risk part using the learning algorithms of the platform 307. That is, the disclosed embodiments may perform balancing of input primary and derived secondary data to diagnose in adequate areas of the supply chain, and to provide substantially optimal solutions for those areas when considering a wide range of factors, noting that the optimization and diagnosis capabilities need not necessarily optimize for any given single factor or supply chain node.

FIGS. 5A-5F illustrates various examples of data processing under various embodiments. FIG. 5A provides an exemplary process based on MOQ data points. In this example, the logic is to process an ABC classification, indicating how often a component is procured. For example, an "A" class part may be procured every 7 days, class "B" 14 days and class "C" 28 days. The MOQ and multiple (Pack Size) data points are then processed in the system over a predetermined time period (e.g., 90 days). Referring to FIG. 5A, the system calculates a 7 day-of-service (DOS) quantity of 5,911 based on a daily forward looking demand of 844. If the system is configured to have a DOS threshold of 7 days, the respective multiple quantity of 1,000 may be rounded up to greater than the 7 DOS quantity, which results in a new MOQ of 6,000 (6× multiple qty. 1,000). Here, the supplier may be notified to reduce MOQ to 6,000, as the purchaser will not want to purchase more than 7 DOS for a class "A" part. Furthermore, if a multiple quantity is a genuine pack size, then the purchaser may be able to purchase 6 units instead of 10. Since the unit reduction is calculated to be 4,000 (10,000–6,000), the reduction value may be multiplied by the unit value to determine a total opportunity value. This calculation in turn may be used by the system to effect monthly/quarterly ending inventory values. Such a configuration advantageously improves end-of-life situation and reduce liability within a supply chain.

Turning to FIG. 5B, the exemplary embodiment provides an illustrative process based on safety stock data points. In this example, the system determines if a safety stock is available, and, if one is available, a similar ABC and daily demand logic described above is applied. The daily demand quantity is used to calculate what seven, fourteen and 28 DOSs should be, and, if the part safety stock quantity is greater than this value, then a new safety stock quantity is established. In one example, class "A" part of 5,911 quantity is determined to have a 7 DOS. Accordingly, the system automatically sets a new SS quantity at 5,911. One reason for this is that, for class "A" parts, a location should not be holding more than 7 days safety stock, (unless otherwise configured by the system), as this pulls the full order book from suppliers early and may affect ending inventory values. In the example of FIG. 5B, the same process may be repeated for "B" and "C" classes for 14 and 28 day time periods, respectively.

FIG. 5C illustrates an exemplary embodiment using lead time data points. Lead time data is more straightforward to process, where the system simply takes a SAT quote for the part and supplier combination. If the system finds a quote and the lead time is less than what is entered in the system, additional processing steps may be taken. First, daily demand quantity is calculated, and, based on this, the system uses the difference between the current lead time and the SAT lead time to calculate an opportunity value. As an example, assuming a unit cost is $1, and a lead time reduction is 84 days in SAP versus 70 days in SAT (14 days), the 14 day reduction may be processed with a daily demand value such that 844×$1=$844×14 days=$11,822.

In FIG. 5D, an exemplary embodiment is provided using safety lead time data points. Similar to lead time, safety lead time is straightforward for the system to process, where the system looks for the removal of the full SLT if the SLT indicator is set. In this case, the system calculates a daily demand quantity, and, based on this, it uses a reduction of a current SLT to calculate an opportunity value. For example, assuming a unit cost is $1, and the SLT is 10 days in SAP, the daily demand value (844×$1=$844) is multiplied by the reduction of 10 days, which results in $8,444.

In FIG. 5E, an exemplary embodiment is illustrated for the system utilizing excess stock data points. Here the owned stock on hand is compared to the next 90 days of demand. If the stock is greater than the specified demand, then the remaining quantity is then used as an excess quantity. As such, an opportunity value may be calculated, based on a product of the standard unit cost. For example, if 150,000 units of stock is on hand, and the next 90 days demand (which may include past demand) is only 76,000, the system would process the data such that 150,000–76,000=74,000. Again assuming a unit cost of $1, the opportunity value may be determined to be $74,000. In one embodiment, the system may also highlight is the part/unit has potential supplier returns privileges in place via a connection to SAT.

In FIG. 5F, a supply not required data point processing embodiment is shown. In this example, certain supplier purchase orders are not required to meet current quarter demands. Here, the opportunity value is not necessarily limited the purchase order quantity (e.g., use exception); the system calculates a quantity arriving within a quarter which is greater that a needed quantity. For example, assuming a unit cost is $1 and the stock on hand is 100,000, the demand unit quarter end is 12,000 and a supply unit QTR end is 50,000. Here the system would process the data points as (100,000+50,000)–120,000=30,000 (or $30,000 that is not required, representing $30,000 of opportunity)

In addition to the examples provided in FIGS. 5A-F, other variables may be utilized by the system for optimization. For example, master production schedule (MPS) tactical rules may be employed to generate a scorecard format in order to identify areas of concern and opportunity. By using a plurality of variables as inputs, an MPS may be configured to generate a set of outputs for decision making within the system. Inputs may include any of the data points disclosed herein, as well as forecast demand, production costs, inventory money, customer needs, inventory progress, supply, lot size, production lead time, and capacity. Inputs may be automatically generated by the system by linking one or more departments at a node with a production department. For instance, when a sale is recorded, the forecast demand may be automatically shifted to meet the new demand. Inputs may also be inputted manually from forecasts that have also been calculated manually. Outputs may include amounts to be produced, staffing levels, quantity available to promise, and projected available balance. Outputs may be used to create a Material Requirements Planning (MRP) schedule.

Other variables may include product lead-time stack data, where procurement and manufacturing lead times are stacked (which may also include safety lead times) to an end product level to identify areas of concern and opportunity. Supply chain models may also be used to optimize inventory. For example, if a sub-optimal supply chain model is not in place with current suppliers, arrangements with customers may be processed to improve the supply chain model, which in turn could allow for identification and/or quantification for potential inventory reduction or inventory avoidance opportunities. Supplier payment term data may also be cross-referenced to identify potential extended payment terms to produce better cash flow.

Generally speaking, certain features and processes described herein are based on a "plan-do-check-act" (PDCA) methodology, where the PDCA cycle may be thought of as a checklist of multiple stages to solve SCM issues. The methodology described above may effectively be used to identify opportunities, and, when no suitable opportunities are available, cycle the system to flag the lack of opportunity and move to another suitable area.

Figure 6:
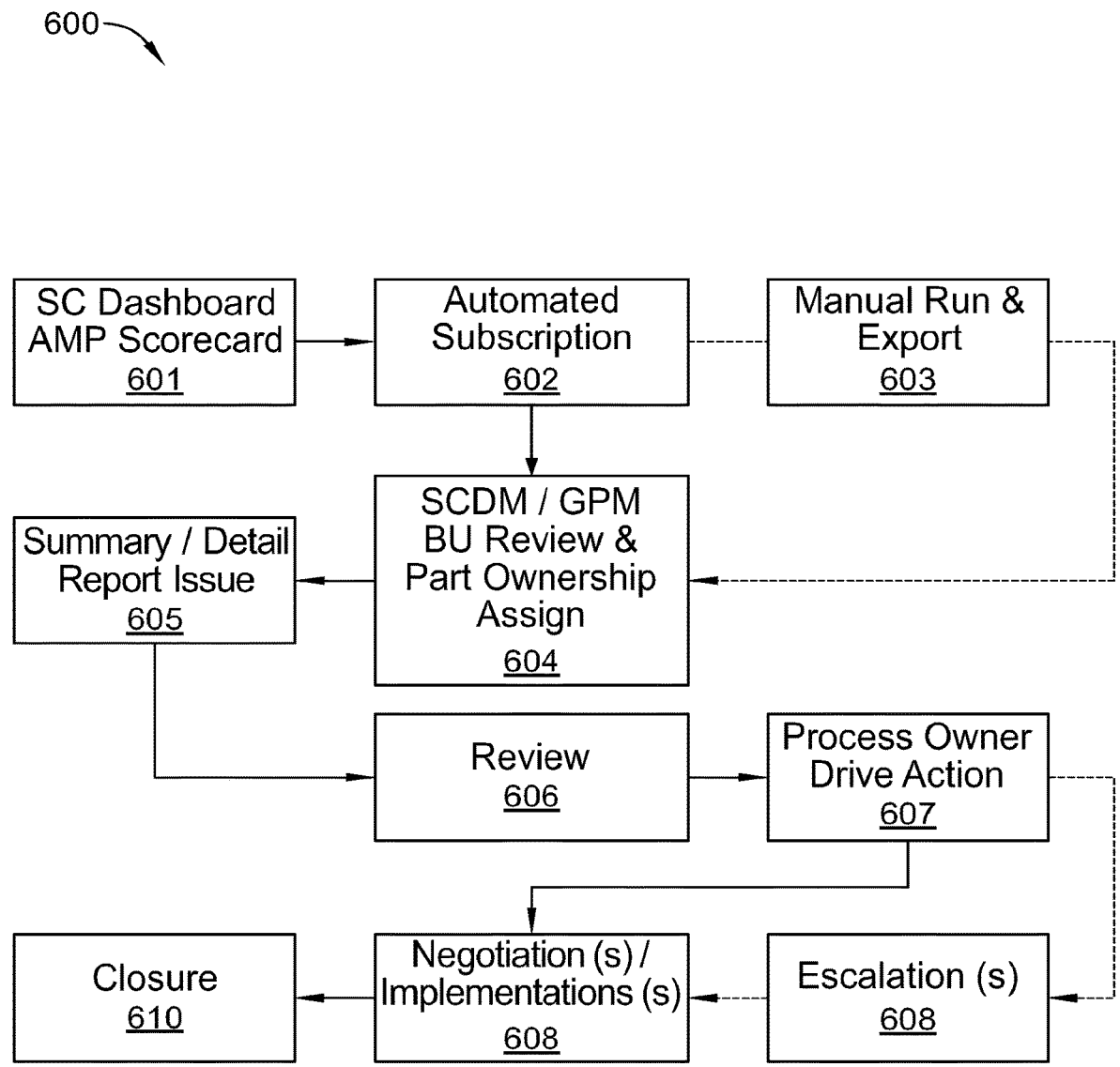
FIG. 6 illustrates an exemplary automation process suitable for utilization in the embodiment of FIG. 1.

In FIG. 6, an exemplary block diagram of an automatic AMP process is illustrated, where a supply chain dashboard and scorecard for SCM data is generated by the system in 601 and forwarded to automated subscription 602. In certain instances when a process cannot be automated, a manual run and export function 603 may be provided. SCM data may then be processed in a supply chain development manager (SCDM) module/global planning manager (GPM) module that may be part of the system platform. The modules allow for business team analytics and review, where part ownership is assigned and used to provide one or more summary/detail reports issued at predetermined times (e.g., weekly). Once the system has reviewed the relevant data, a process owner utilizing the system may drive action for subsequent negotiation/implementation 609. In instances where unresolved issues arise, an escalation process may flag the issue for higher level system review. As processes are completed (or left unresolved), the system closes the current process.

Figure 7:
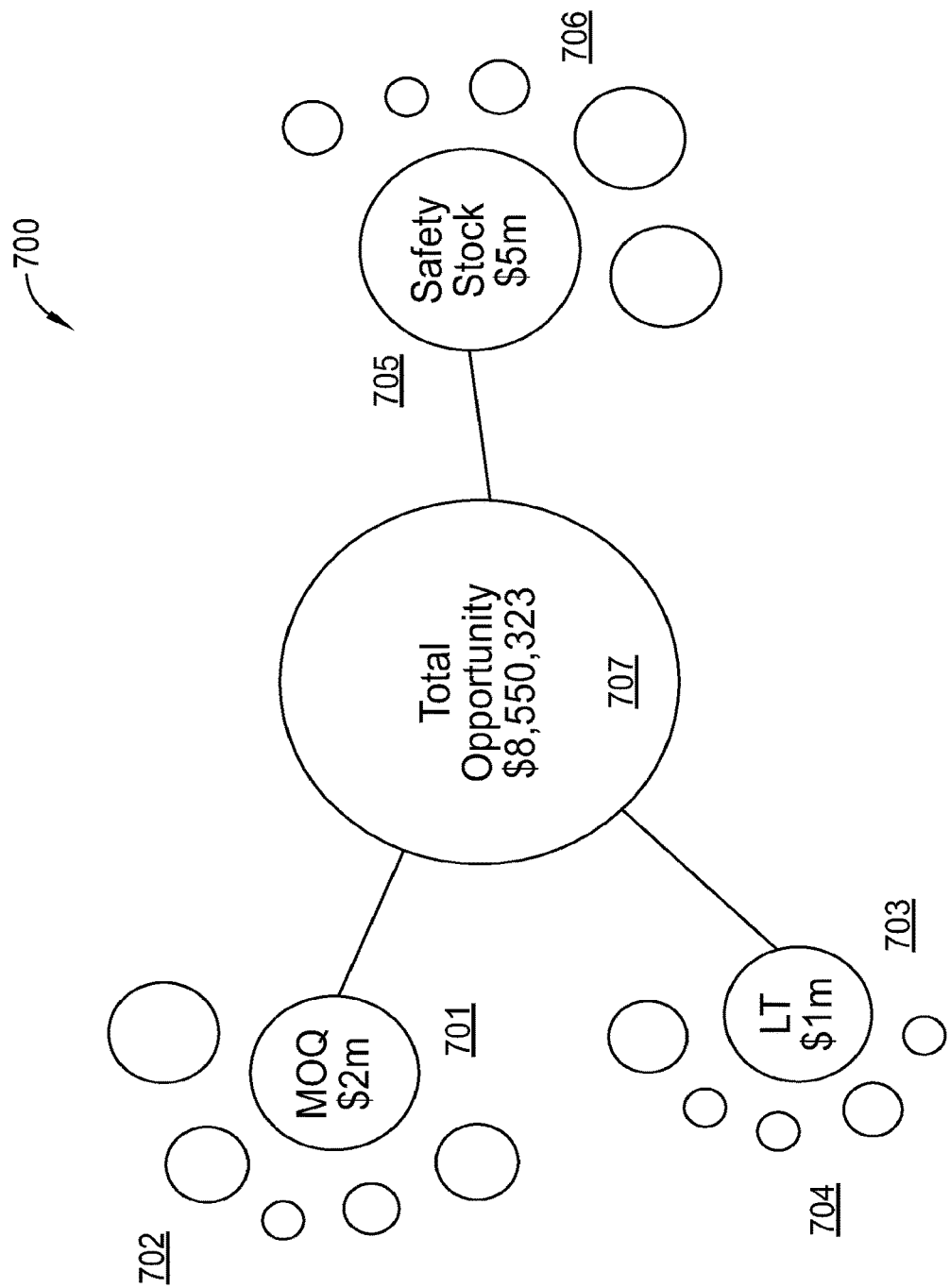
FIG. 7 illustrates an exemplary data visualization example for SCM processing.

In addition to data processing, the SCM platform system advantageously packages processed data to be uniquely visualized on a user's screen. In the example of FIG. 7, an exemplary bubble chart 700 is illustrated, where a total opportunity visualization is provided using MOQ, lead time and safety stock data points. Here, various opportunities identified in the system relating to MOQ using any of the techniques described herein. The various identified opportunities are visualized in the system as "bubbles" of varying size 702, where the size of the bubble is dependent upon the size of the opportunity. In this example, MOQ opportunity 701 is identified as having the largest opportunity ($2 M). The remaining bubbles in the exemplary illustration, as well as in certain other examples disclosed herein, may, of course, represent other opportunities available.

Similarly, lead time opportunities identified by the system are visualized 704, where lead-time opportunity 703 is identified as the largest opportunity ($1 M). Likewise, safety stock opportunities 706 are identified and opportunity 705 is identified as the largest opportunity ($5 M). As each of the largest opportunities are identified (701, 703, 705), they are linked to total opportunity bubble 707 which visualizes a total opportunity value ($8,550,323). The system may be configured such that, as other opportunities (i.e., opportunities other than the largest) are selected, the total opportunity bubble 707 automatically recalculates the total opportunity value for immediate review by a user. Such a configuration is particularly advantageous for analyzing primary and secondary opportunities quickly and efficiently.

Figure 8A:
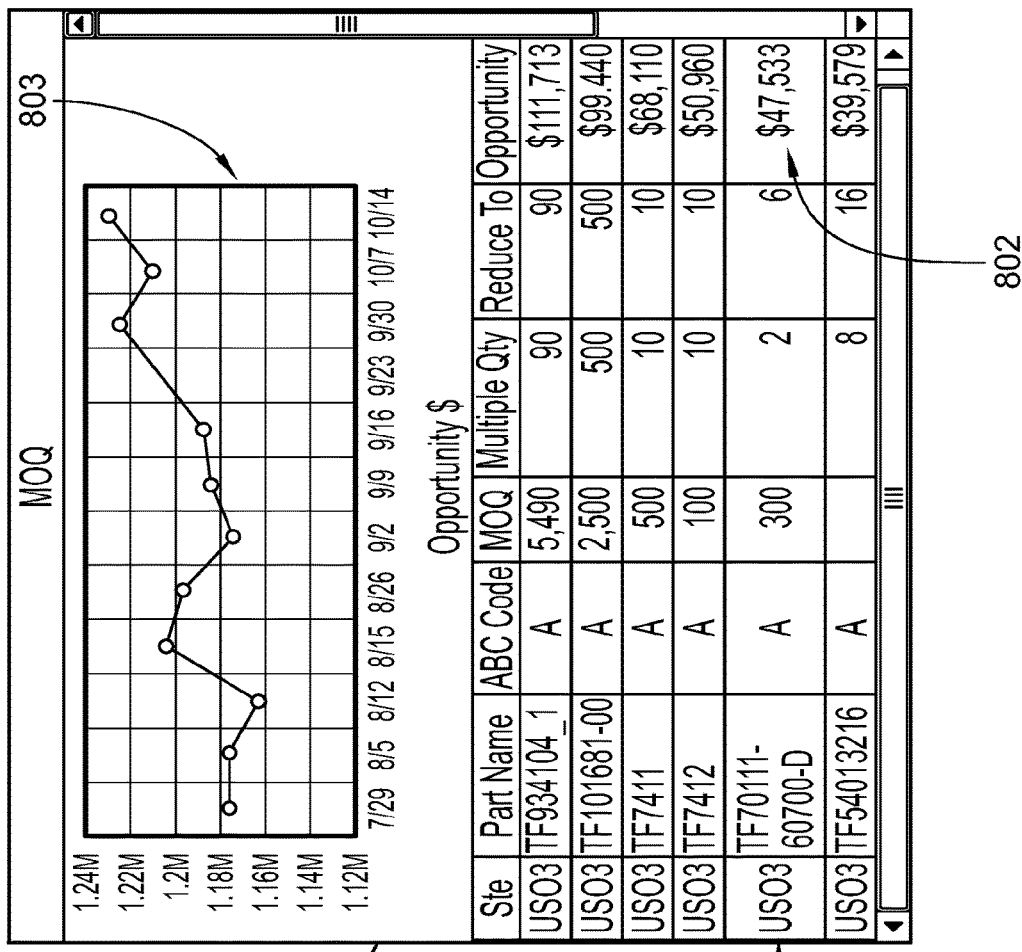
FIG. 8A illustrates a further data visualization and "one-click" report generation under one embodiment.

The bubble data visualization of FIG. 7 may be advantageously configured to provide immediate analytics generated from one or more modules in the system. Turning to FIG. 8A, an exemplary embodiment is provided where opportunity bubble 701 is selected, which in turn launches analytics window 801 comprising graphical 803 and textual 802 representations of the underlying data. In this example, graphical representation 803 comprises a chart illustrating a dollar value opportunity trend spanning a predetermined time period. Textual representation 802 comprises a table, indicating a site location (Ste), part name, ABC code, MOQ, multiple quantity value, reduction value and opportunity value, similar to the embodiments discussed above in connection with FIGS. 5A-F. In chart 802, the component opportunities making up the total MOQ opportunity may be simultaneously viewed to determine greater details surrounding the opportunity.

Figure 8B:
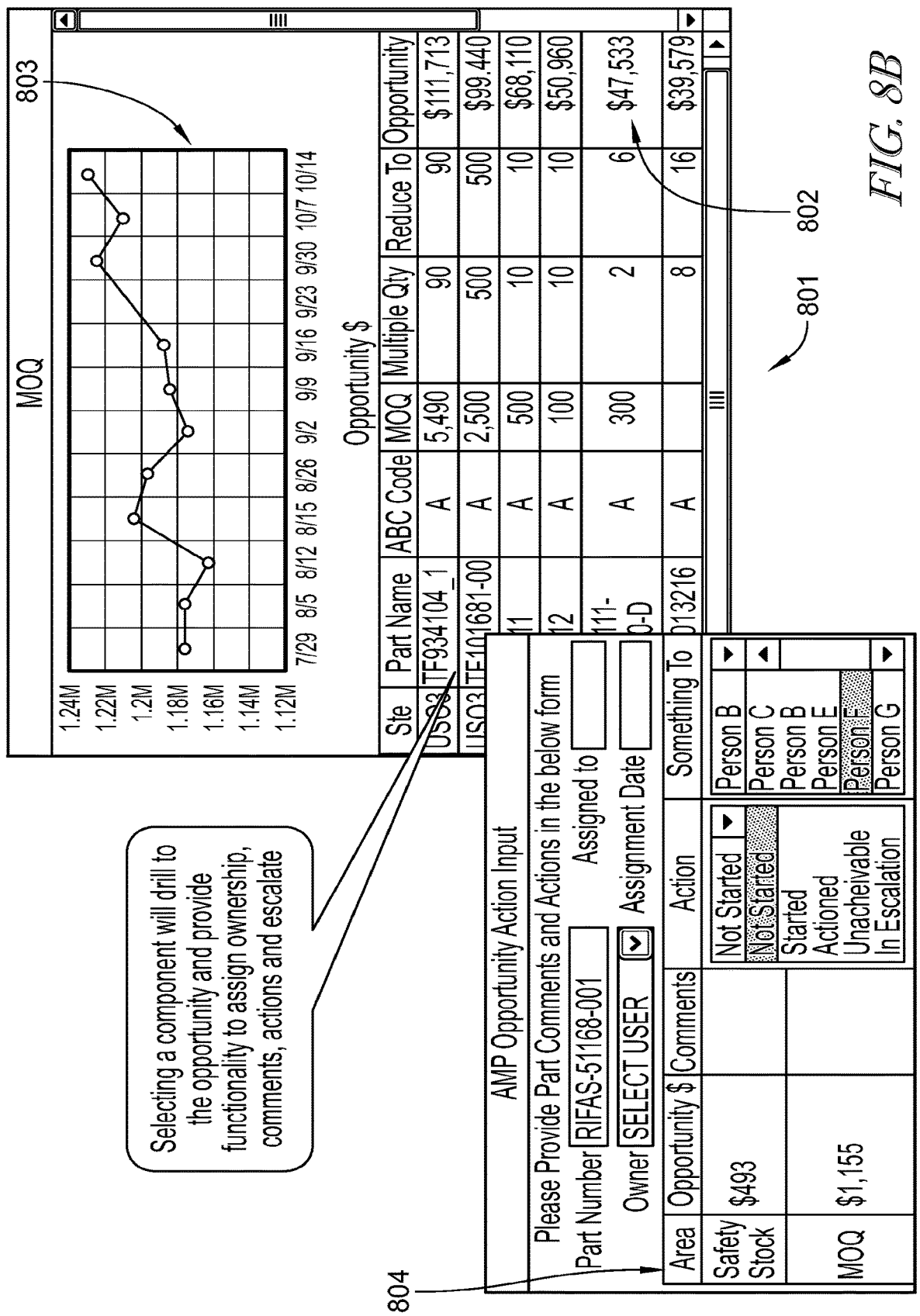
FIG. 8B illustrates a functional action input module associated with report generation from the data visualization of FIG. 8A.

FIG. 8B illustrates an embodiment, where, if a system component is selected in section 802, a functionality window 804 is provided for assigning ownership, comments, entering actions and escalation to components of 802. In this example, window 804 enables entry of ownership ("owner") for a part number, and an "assigned by" and assignment date entry for each area (safety stock, MOQ). Comments may be entered into window 804 as shown, together with an action drop-down menu allowing automated action entries such as "not started", "started", "achieved", "unachievable" and "in escalation". For the escalation drop-down menu, escalation system managers may be assigned via the interface for further action.

As part of the embodiments disclosed herein, the system is further enabled to process and calculate risk(s), and various other factors and related factors, within supply chains, automatically and based on real time data from a variety of sources. Generally speaking, supply chain risks may emanate from geographic risk and attribute-based risk, among others. For geographic risks, manufacturing locations are registered within the system for parts purchased so that when an area becomes volatile because of sociopolitical, geographic, (macro-) economic, and/or weather-related disruption, related variables may be processed to determine an effect on, or risk to, a supply chain.

For attribute risk, the system may be configured to calculate a risk-in-supply chain (risk attribute) value, where a risk attribute value is based on a framework that analyzes various different risk categories of the supply chain. FIG. 9 illustrates an exemplary embodiment in which attributes 901-906, along with their respective descriptions 907, are assigned risk weight values 908 to calculate risk. In one embodiment, a total risk attribute score may be based on a 1-5 scale, with 1 representing the least risk and 5 representing the most risk. The weights may be applied to stress attributes that may be more important than others in calculating supply chain risk. After multiplying a score in each category by the associated weight, scores for each part on an end product or assembly may be added up and divided by the number of parts to determine a risk attribute score for each assembly. Next, scores for each assembly for a customer are added up and then divided by the number of assemblies to determine a risk attribute score for the customer.

In the embodiment of FIG. 9, the example illustrates six attributes: alternative sourcing 901, part change risk 902, part manufacturing risk 903, lead time 904, spend leverage 905 and strategic status 906. It should be understood by those skilled in the art that additional attributes or fewer attributes may be utilized by the system. Moreover, in the illustration, the attributes are weighted by a weighting algorithm (applied at platform 307 or one of its associated apps) at 36%, 19%, 9%, 19%, 19%, and 0%, respectively, although those skilled in the art will appreciate that these weightings may be varied. Additional attributes may comprise defects per million, lot return rate, corrective action count, inventory performance, environmental and regulatory items, security programs (e.g., Customs-Trade Partnership Against Terrorism (C-TPAT)), supplier financial status, supplier audit results and component life cycle stages, among others. It is also worth noting that attributes and weighting may be dependent upon data availability, i.e., algorithms and selected attributes may be modified based on availability, and the data selection and/or aspects of the applied algorithm may be controlled automatically and in real time by platform, and/or control may include or be exclusively indicated by manual inputs of data or aspects of the algorithms.

An exemplary risk attribute score detail is provided in the embodiment of FIG. 10. The embodiment of FIG. 10 illustrates an exemplary report for an assembly, where the report is based on each of the parts making up the assembly and the associated risk attribute scores. In FIG. 10, a part level report is provided which provides additional detail by part to show risk attribute score specifics. Such a report may break out each category score so that a user may see where, and to what extent, risk exists, and potential courses of action that may be taken to lessen the risk. As is illustrated in FIG. 10, the platform 307, and/or the individual app, may receive primary data and generate therefrom secondary data, such as calculation of the risk attribute score. In the example shown, the primary and secondary data used to generate the risk attribute score is the same as that of FIG. 9, although those skilled in the art will appreciate that other primary and/or derived secondary data may be used in supply chain risk calculations.

For example, and as illustrated in FIG. 11, if an alternative sourcing category contains a high risk attribute score, a user may investigate the parts where the user requires purchase from only one manufacturer ("sourced parts") which may be causing a high risk attribute score. The user may configure the system to enable or suggest other manufacturers as suppliers which will lower the risk attribute score by diversifying the supply base. Long lead times may increase a risk attribute score as well. As such, a user may configure the system to communicate or order suppliers to lower lead times so that a manufacturer may react quicker to demand changes if the parts can be bought and received in a shorter time period. In either case, the risk attribute system module allows a manufacturer to be a proactive party in the chain and suggest alternative sourcing using an extended supply base to lessen the amount of sole source parts and reduce lead times for a customer. Of course, it is understood by those skilled in the art that the risk attribute calculations disclosed herein may be applied to any aspect or attribute of a supply chain system including parts, suppliers, manufacturers, geography, and so forth.

FIG. 11 additionally serves to illustrate that a weighting algorithm may be employed with regard to primary and/or secondary data to arrive at requested information, and further that such weighting algorithm may be adjusted over time, such as by platform 307, based on "learning" that occurs upon application of the algorithm. For example, if actual risk is repeatedly indicated as higher than a generated risk attribute score, the weighting algorithm shown in FIG. 11 may be adjusted, and/or the primary and secondary data that is used in the score calculation may be modified, etc., in real time by the platform 307 (and/or by the app making use of the primary data, secondary data, and algorithms provided by the platform 307).

The risk attribute processing may subsequently be utilized by, and/or may utilize, the SCM platform 307 to generate a heat map to visualize risk attribute scores and their impact easily and quickly for a user. In certain embodiments, heat maps may allow the display of multiple variables, such as revenues and risk. In the illustrative example of FIG. 12, a heat map 1200 is shown for a plurality of assemblies (Assy 101-105), where each assembly is associated with one or more parts. Thus, assembly Assy 101 comprises five primary parts ("parts 201-205"), Assy 102 comprises "parts 206-210", Assy 103 comprises "parts 211-215 and so on.

Figure 12:
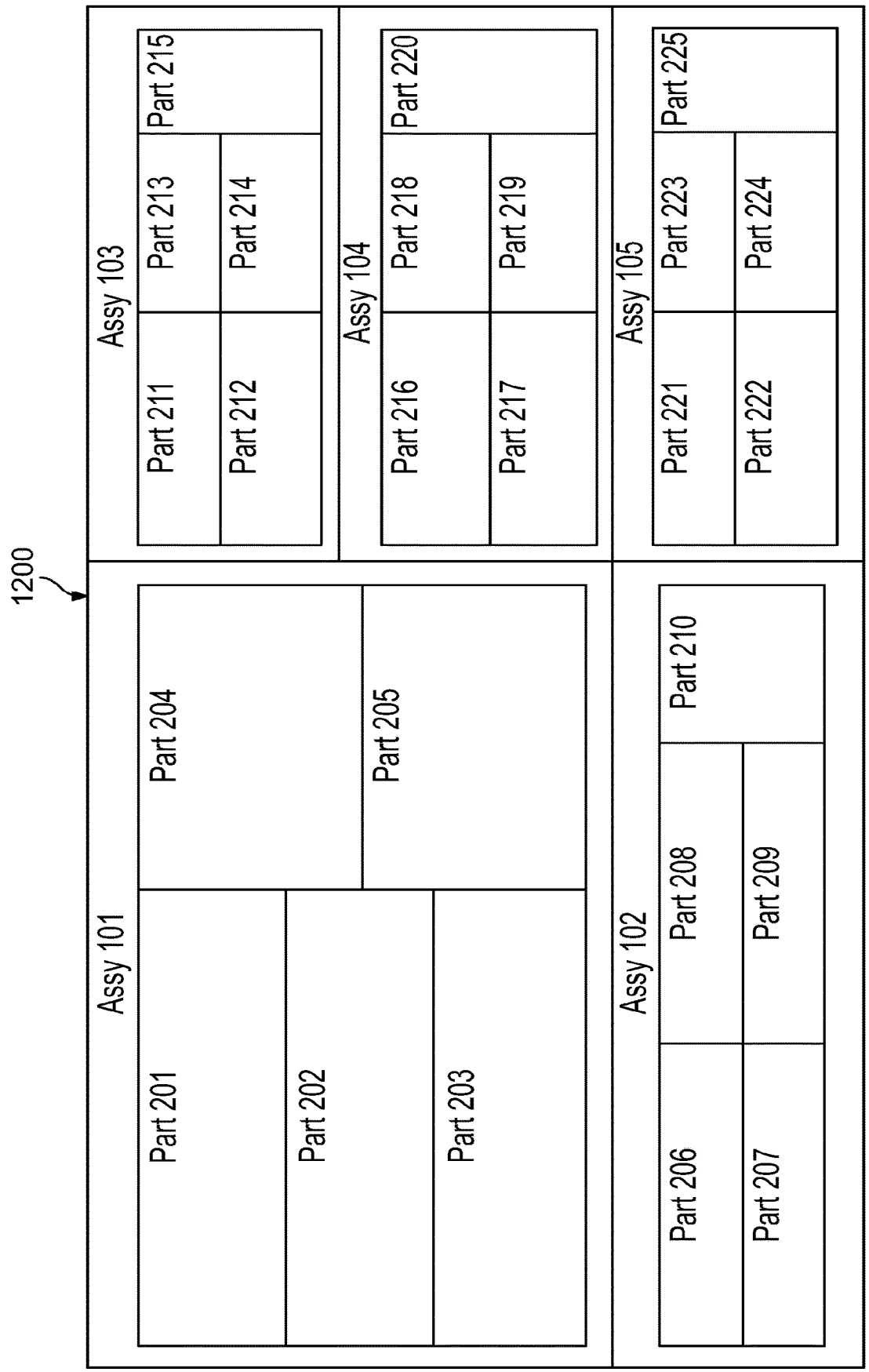
FIG. 12 illustrates an exemplary data visualization heat map for various assemblies and associated parts, wherein specific assemblies and/or parts are presented as color-coded objects to indicate a level of risk.

In one embodiment, assemblies or parts with higher revenue over a predetermined time period (e.g., 90 days) are visualized with bigger boxes compared to assemblies and/or parts having lower revenue. In addition to size, the heat map may color code boxes to reflect risk attribute scores. The color codes may be configured to show green for low risk, yellow for medium-low risk, orange for medium-high risk and red for high risk. As shown in FIG. 12, the risk attribute module may be configured to utilize a nested "heat map" format for inserting one set of heat maps into a higher level heat map. Thus, the heat maps for parts may be simultaneously visualized with their associated assembly.

The figures discussed throughout provide illustrative screenshots of system and system platform operation disclosed herein. The system screen layout may contain a plurality of workspace and navigation areas. A cross-function pane may be provided to present functional areas of a business which are included in the platform. User roles may be assigned in the system to control which functional areas may be made visible to different user groups. A tool pan may likewise be provided for tools that are available within each functional area of the business. User roles may control which tools are visible to different user groups. A main content pane may be provided as a main workspace of the platform which contains data and informational content. In embodiments, a news feed/main page/landing page may also be provided, such as for a chronological timeline of events, facts, occurrences, status, risks, or the like which may be particularly relevant to the user and/or relevant to the particular design/product/similar designs or products. "Pings" may contain alerts such as new critical shortages. In one embodiment, a social data interface may be provided for real-time information from sources such as Twitter. Through various interfaces, data may be filtered by geography, organization level or both.

Figure 13:
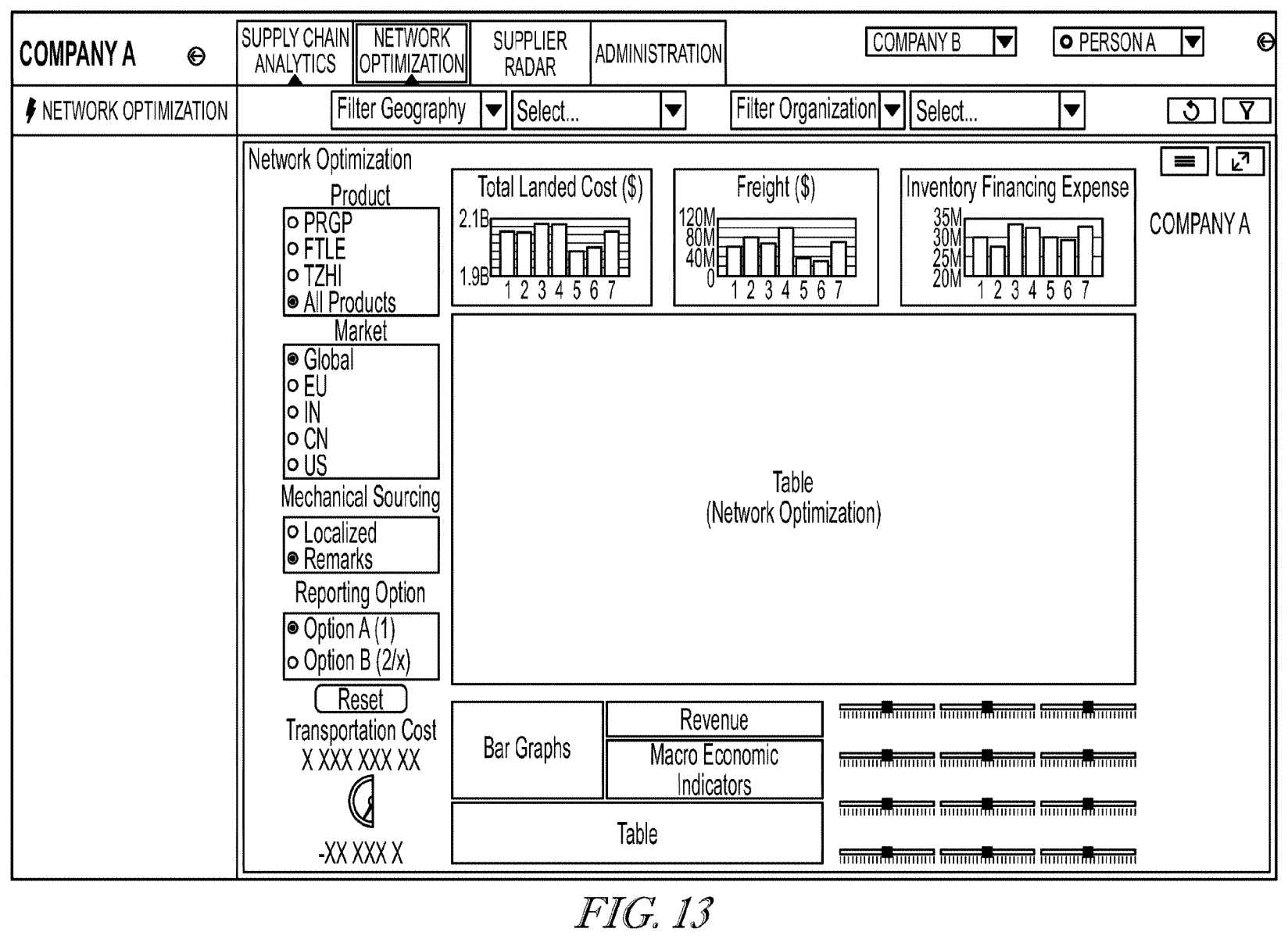

Turning to FIG. 13, an exemplary screenshot is provided of a network optimizer module function, which provides an active user interface for an exemplary global manufacturing footprint through a total landed cost analysis. The illustration shows a plurality of charts may be provided, such as total landed cost, freight and inventory financing expense. Product, market, mechanical sourcing and transportation costs may further be provided, along with a "scenario" processing screen for displaying options for individual global markets (EU, IN, CN, US). Data points such as annual volume, freight in/out, value add, cost of capital and other log expenses may be conveniently charted for presentation and/or other action. Economic indicators including currency, revenue and acro-economic indicators may be provided as well. More particularly, FIG. 13 illustrates that a supply chain may be subjected to diagnostics to allow for such optimization, such as to provide for the use of analytics on large-volume dat.

In short and as referenced throughout, various aspects of the supply chain, such as manufacturers, resellers, parts providers, and customers of parts and final products, may desire analysis of the supply chain, or at least aspects thereof relevant to that contributor to the supply chain, rather than being limited to that contributor's discrete knowledge of only the aspects of the supply chain immediately exposed to that contributor to the supply chain. Consequently, in certain embodiments software as a service, such as with administrative limitations to access as will be understood by those skilled in the pertinent arts, may provide diagnostics on the overall supply chain, and on discrete aspects thereof.

For example, as product life cycles shrink, the supply chain may necessarily need to become faster, lower in cost, lower in risk, and lower in failure rate, particularly in certain verticals, and this may be reflected in competitive supply chains before it is executed in a supply chain of interest. If these needs, and the supply chain requirements related thereto, may be gleaned from existing data, they may be applied as diagnostics in comparison to a supply chain such that a diagnosis of the flaws or inadequacies of that supply chain may be exposed to allow for improvements.

The foregoing aspects may require significant data-driven aspects of a software as a service for supply chain management. These aspects may include, by way of non-limiting example: visibility into the entire supply chain, including all companies, all resellers, all parts, and so on; analytics capable of analyzing big data in order to assess and balance speed, cost, risk, likelihood of failure, recommended replacements and modifications, and to enable the waiting and balancing of the foregoing factors; and an ability to collaborate and dictate action in the supply chain based on the analytics, such as wherein the collaboration may be in the form of multi-point communications that occur automatically or manually, and such as wherein the actions may be subject to manual triggers or may trigger automatically. Accordingly, to meet future supply chain analysis needs, the supply chain and many or all aspects thereof may be analytically productized, and this may include the people and places that form part of the supply chain.

In order to optimize a supply chain at either the design or the operational phase, needs must be diagnosed and modifications recommended as early as possible in the supply chain management process. That is, necessary future changes in the supply chain to improve speed and costs, and to lower risk and failure rates, must be diagnosed in real time. This improves the operation and inter-operation of all automated aspects of the supply chain, i.e., the management of network resources, computing processing power, the need for manual interaction with automated processes, including ordering processes, and the like. The adverse draw on the aforementioned resources, among other resources, is thus minimized through the use of certain of the embodiments.

Figure 14:
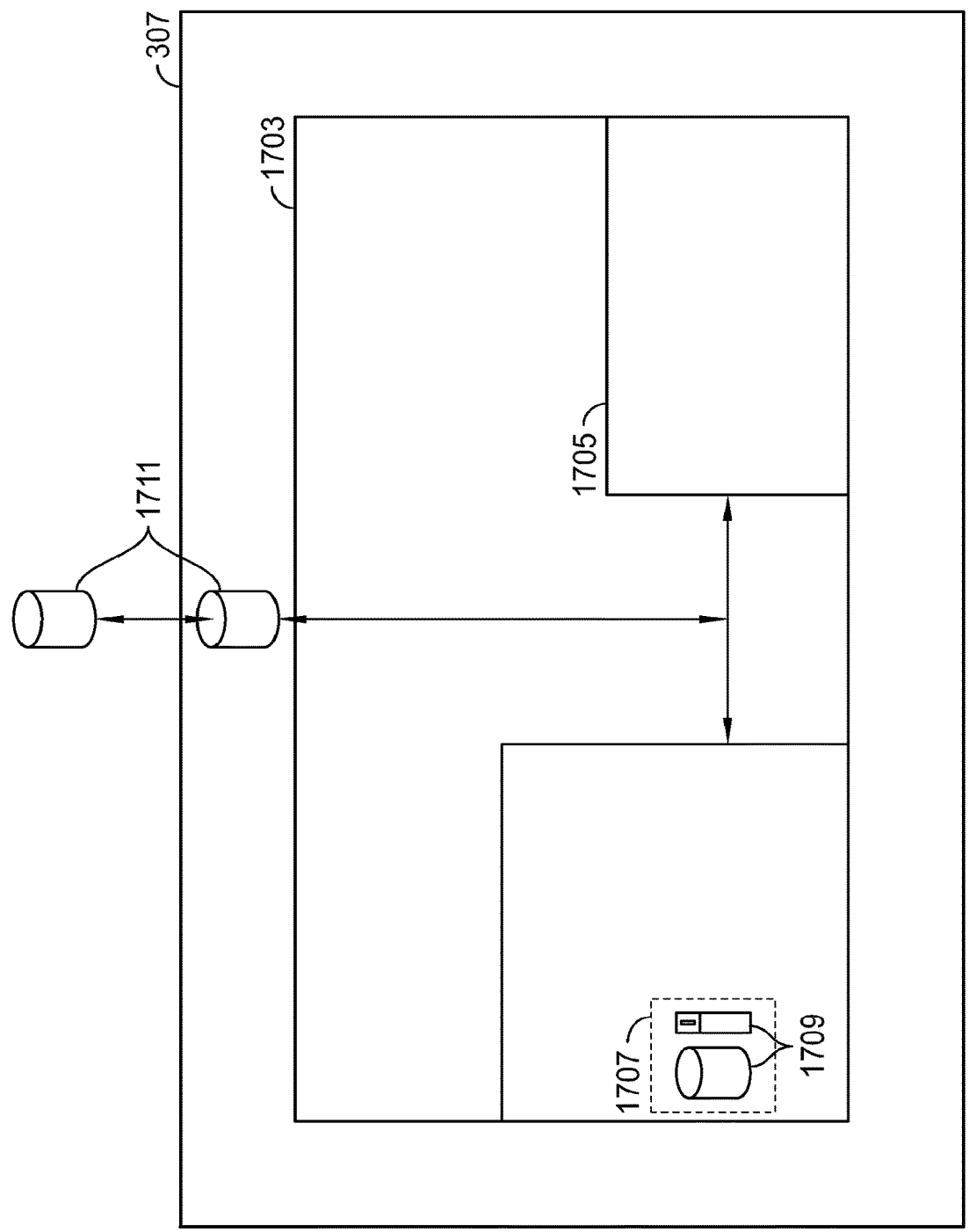
FIG. 14 illustrates an exemplary computing system under the embodiments.

By way of illustration and as shown in the attached figures, a supply chain analytics engine 1703 may be provided within or in association with platform 307, as is shown in FIG. 14. That is, the analytics engine may be, include, be included within, or be distinct from, the supply chain analytics module 304 discussed above. The analytics engine 1703 may include an optimizer 1705 that may perform the functionality described in the Figures below, including diagnostics regarding optimization of computing resources and networking related to SCM such as may be indicated by analysis by a rules engine 1707 that applies at least a comparator 1709 having therein comparative algorithms, such as those discussed below, to the large volume data 1711 from other supply chains, such as may include similar product verticals and dissimilar verticals that integrate similar parts, and to the supply chain of interest. The large volume data may be, include, be included within, or be distinct from analytics data 322, discussed above.

These diagnostics and analytics may be best applied on a node-by-node basis to a particular supply chain. That is, each aspect of the supply chain may be treated as a node, regardless of the function of that node within the supply chain. In that way, a variety of diagnostics may be assessed on each node, and accordingly recommendations may be provided uniquely for each node, and each aspect of each node, in a supply chain.

Figure 15:
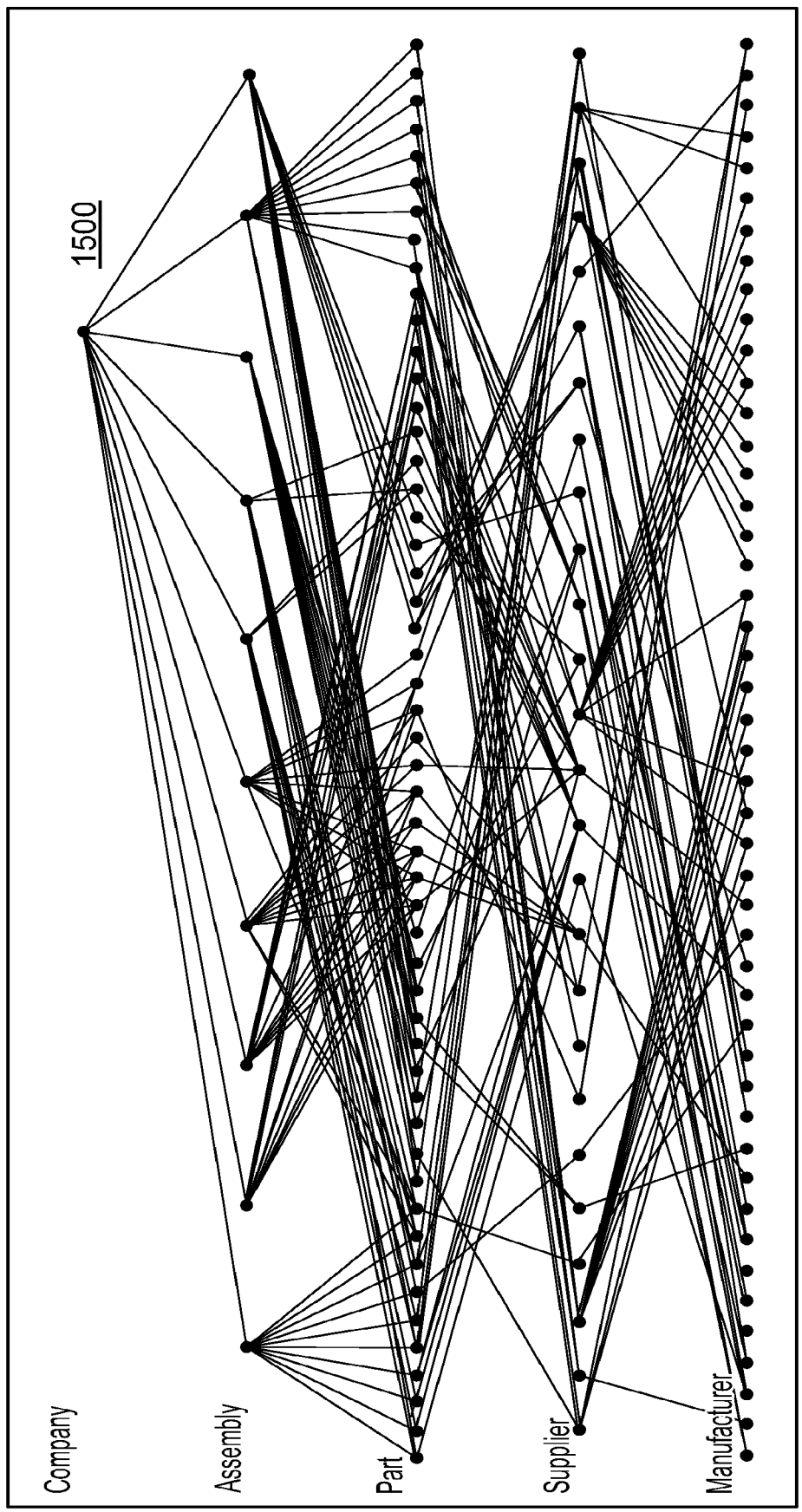
FIG. 15 illustrates an exemplary interface.
Figure 16:
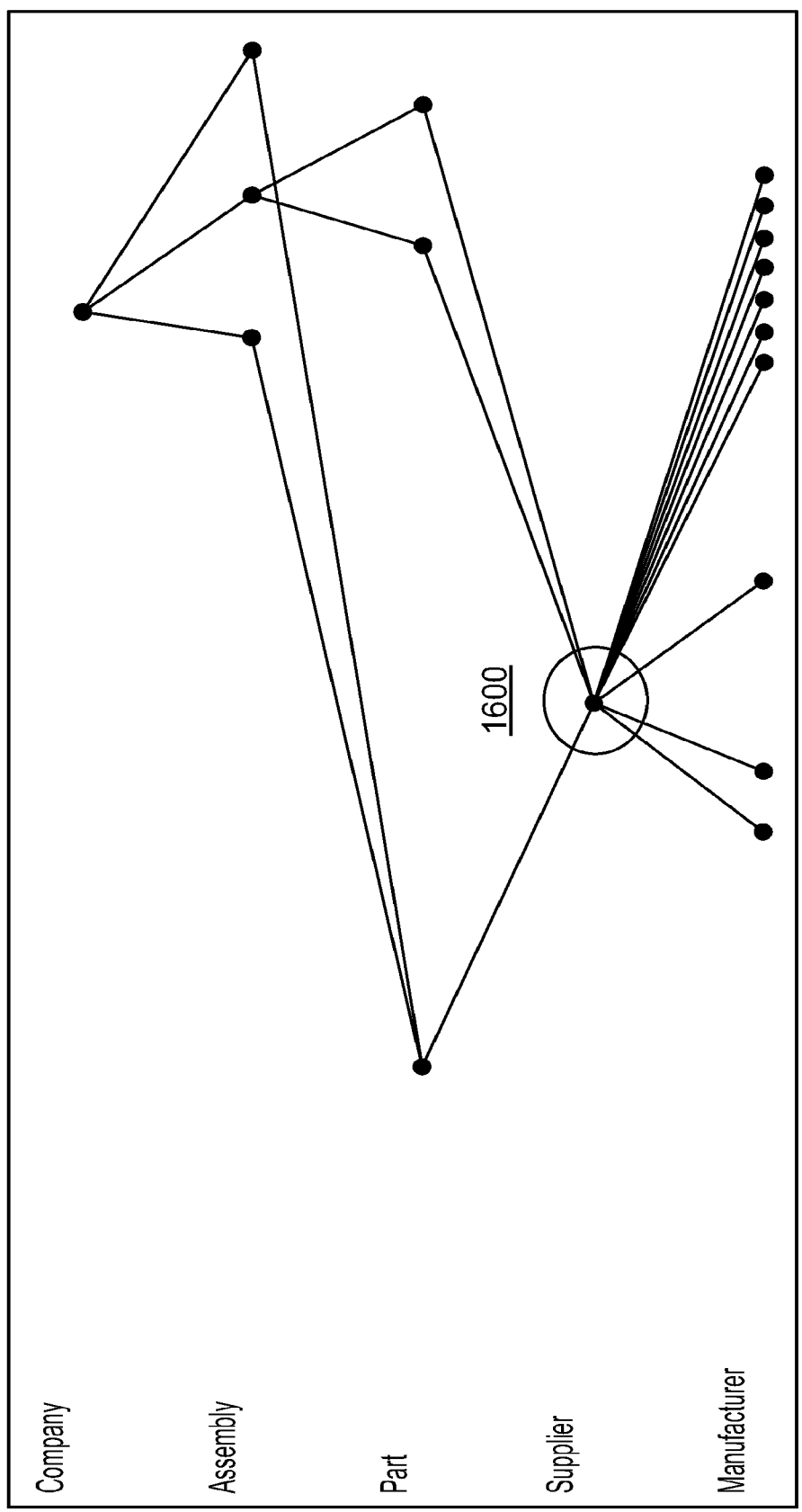
FIG. 16 illustrates an exemplary interface.
Figure 17:
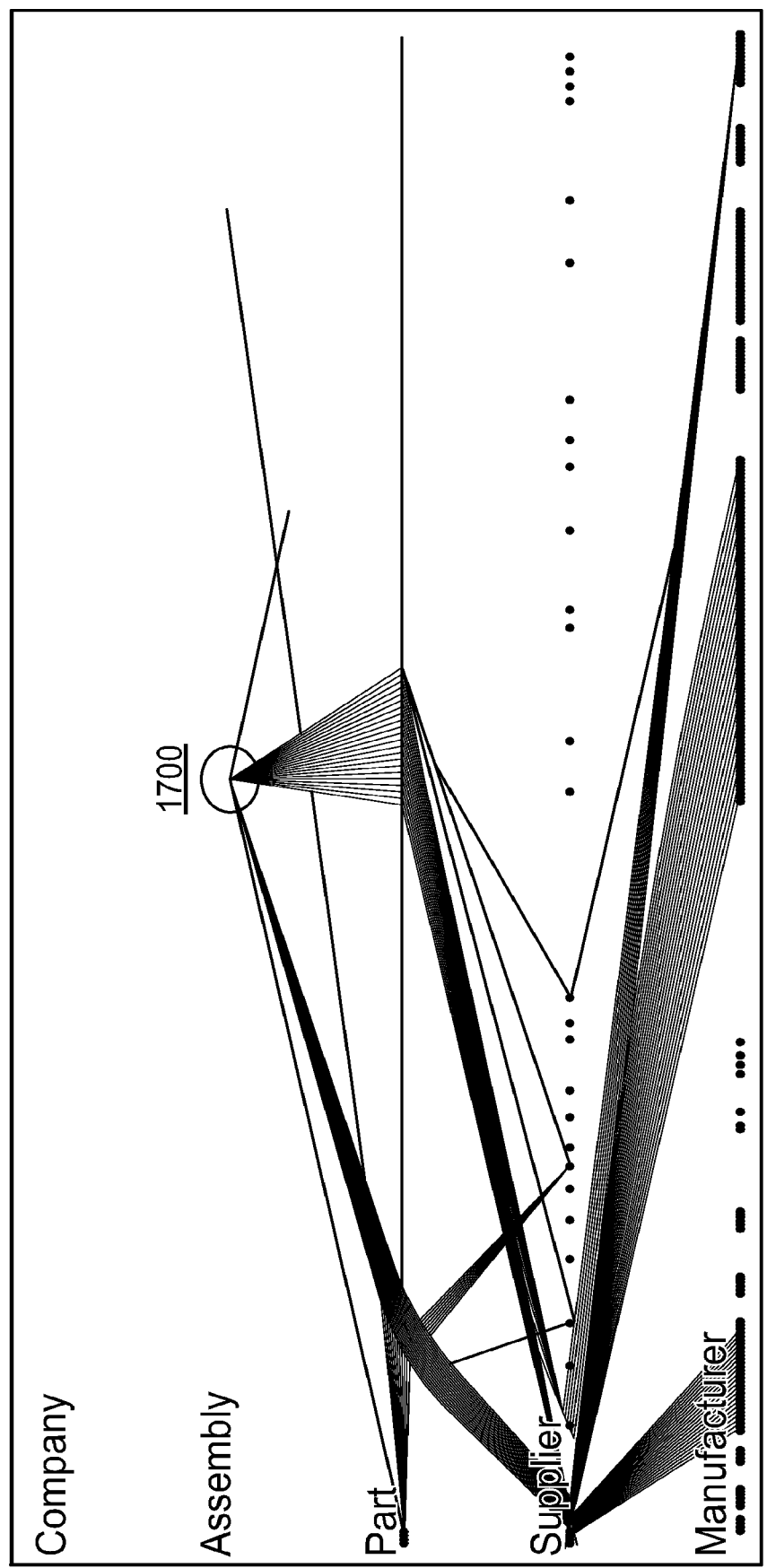
FIG. 17 illustrates an exemplary interface.

An application 214 may be provided as an aspect of platform 307 in accordance with this node-based processing, which application may apply rules engine 1707, as shown with greater particularity in the exemplary embodiments of FIGS. 15-17. Of note, although the visual presentation and information provided by the node processing application illustrated herein may differ from the other applications 214 discussed hereinabove, the same primary and/or secondary data 1711 provided by platform 307 may be accessible to both the node-based and other applications discussed herein.

Supply chains, and particularly those in the field of high-tech manufacturing, can be very complex, and, from a data standpoint may be made up of hundreds of thousands of records and data points. The node network interactive data visualization disclosed herein advantageously allows a customer to see the entire supply chain in a single depiction. Using such a depiction, non-supply chain professionals from any level may quickly and efficiently determine important aspects of a supply chain.

An exemplary node network is illustrated in FIG. 15, wherein primary (root) company node 1500 is connected in a tree node fashion with assembly nodes, part nodes, supplier nodes and manufacturer nodes as shown. Each node of the supply chain in FIG. 15 may be considered as a separate level. These nodes may be configured such that different supply chains will contain different structures or networks. It is understood by those skilled in the art that the example of FIG. 15 is merely exemplary, and that the nodes and node layers may be arranged in a myriad of ways and structures, and may include additional or fewer layers from those depicted in the example.

As shown in FIG. 15, each supply chain node is linked by a connection. These connections may be one-to-one, one-to-many and/or many-to-many. The visualization makes it possible to display every node in a given supply chain in a single graphic which allows a user to understand the overall activity and complexity within a supply chain, as well as its overall health. Likewise, displayed nodes may be limited by a user or by the app, and/or by number or by node type, by way of non-limiting example. The exemplary embodiment allows a user to quickly relate to patters being depicted in the node tree visualization. For example, certain nodes may be quickly identified as having high concentrations of demand flowing through them. Nodes may also be identified having existing overall risk and/or opportunity in certain parts of the supply chain. As mentioned previously, a single holistic visualization may allow a company to make quick and efficient assessments of the health of the supply chain, rather than relying on multiple different screens or charts covering hundreds of thousands of data records and/or data points.

Another advantageous effect of the node tree is the apparent structure of the supply chain is determined quickly. The visualization makes use of data which defines how the supply chain is structured. For example, manufacturers may be linked (e.g., via tags) to suppliers via approved manufacturers lists. Parts may similarly be linked to assemblies via bill of materials (product structures). The complexity of the visualization may be simplified by quickly focusing the node tree to a defined number of nodes. As the nodes and underlying metadata are linked, the selection of one or more nodes may automatically instruct the system to present only the nodes/layers associated with a selected node. This in turn permits focused attention on the nodes that are most relevant (e.g., high demand volume nodes). In one embodiment a predetermined number of "top" nodes may be displayed for each node parent (e.g., based on the top 10 highest demand volume nodes).

As each node carries pre-calculated data attributes (metadata), the data attributes may be dynamically categorized based on predetermined thresholds. The attributes may further be categorized and color coded as discussed herein. For example processed attributes showing issues may be displayed in red, attributes showing opportunities may be displayed as green and neutral attributes (i.e., neither an issue nor an opportunity) may be displayed as white. As such, the overall health of the supply chain may be determined.

The visualization of various nodes is preferably interactive, allowing data attributes for each node to be drilled down. Dynamic filtering may further be applied to display upstream and downstream nodes by selecting any single node in the supply chain. In the exemplary embodiment of FIG. 16, a selection of supplier node 1600 may cause the system to automatically apply filtering to only display upstream and downstream nodes having dependency on selected node 1600. In the exemplary embodiment of FIG. 17, selection of assembly node 1700 may cause the system to highlight upstream and downstream supply chain nodes.

The supply chain nodes illustrated in FIGS. 15-17 may thus be subjected to the comparator 1709 of FIG. 14. Accordingly, the wealth of data 1711 available to the disclosed algorithms 1707 may be subjected to comparative analytics 1709 (which may be anonymized), and the output from these analytics may include node-based diagnostics that may include flaws, areas for improvement, recommendations, or inadequacies that may be weighted, prioritized, or otherwise ranked in order to improve and optimize the supply chain according to the diagnostics.

The optimizer 1705 may be a compare and contrast aspects of a particular node to other like nodes in other supply chains, to optimal node performance, and/or to node projected performance to support an optimized supply chain. Thereby, the user may be enabled to interact, such as through the graphical user interface shown and discussed herein and using known computing peripherals, with the comparison in order to receive diagnostics to optimize the supply chain. These diagnostics may be provided by any known methods, including a side-by-side simultaneous graphical illustration, such as may include user interactivity to enable a user to make modifications categorically within the side-by-side comparison to assess effects of those modifications on the side-by-side comparison; one or more of a series of split windows, hierarchical drill down menus, or the like; or by any other known methodology.

As discussed, analytics are algorithmically applied, such as both based on pre-stored, user input, and/or learning algorithms, in order to provide the disclosed optimizations. These analytics may review a variety of variables indicated by data from data store 1711, including but not limited to lead time, alternate parts, product and part lifecycle, supplier and reseller alignments, product and part risk assessment, and the like, wherein each of the foregoing may be weighted or otherwise balanced in accordance with the user's input objectives, in order to provide diagnostics on the supply chain based on all of the foregoing and other factors, such as manpower, geographic, and environmental effects, by way of example.

Moreover, these diagnostic outcomes may typically stem not only from the user's input data, but may also from data gained from numerous similar and dissimilar products, the parts used to make those products, the suppliers from which those parts are obtained, the manpower and geography necessary to make those parts, and the like, all of which data may reside in data store 1711. Thereby, the disclosed analytics may provide optimized suppliers, parts, source and assembly locations, and the like, which allows for a significant ramping of speed to market for an input product design. Moreover, and as disclosed herein, a subscriber to the SaaS system set forth herein may be enabled to access very significant and or anonymized content in order to diagnose aspects of the supply chain.

It goes without saying that the analytics 1709 discussed herein, particularly when engaged in "learning", may change as data is accumulated in data store 1711 from particular verticals and/or across similar or dissimilar products. By way of example, to the extent the comparison discussed herein is generated repeatedly to include a particular part or parts, and the algorithmic estimation of performance of the supply chain in light of that modification in the comparison repeatedly proves to underperform the estimated comparison, the disclosed learning algorithm may assess that the particular part or parts common among the failed analytic estimations are the root cause of the failure. Thereby, the recommended use of that part or those parts in future designs may be automatically minimized.

Figure 18:
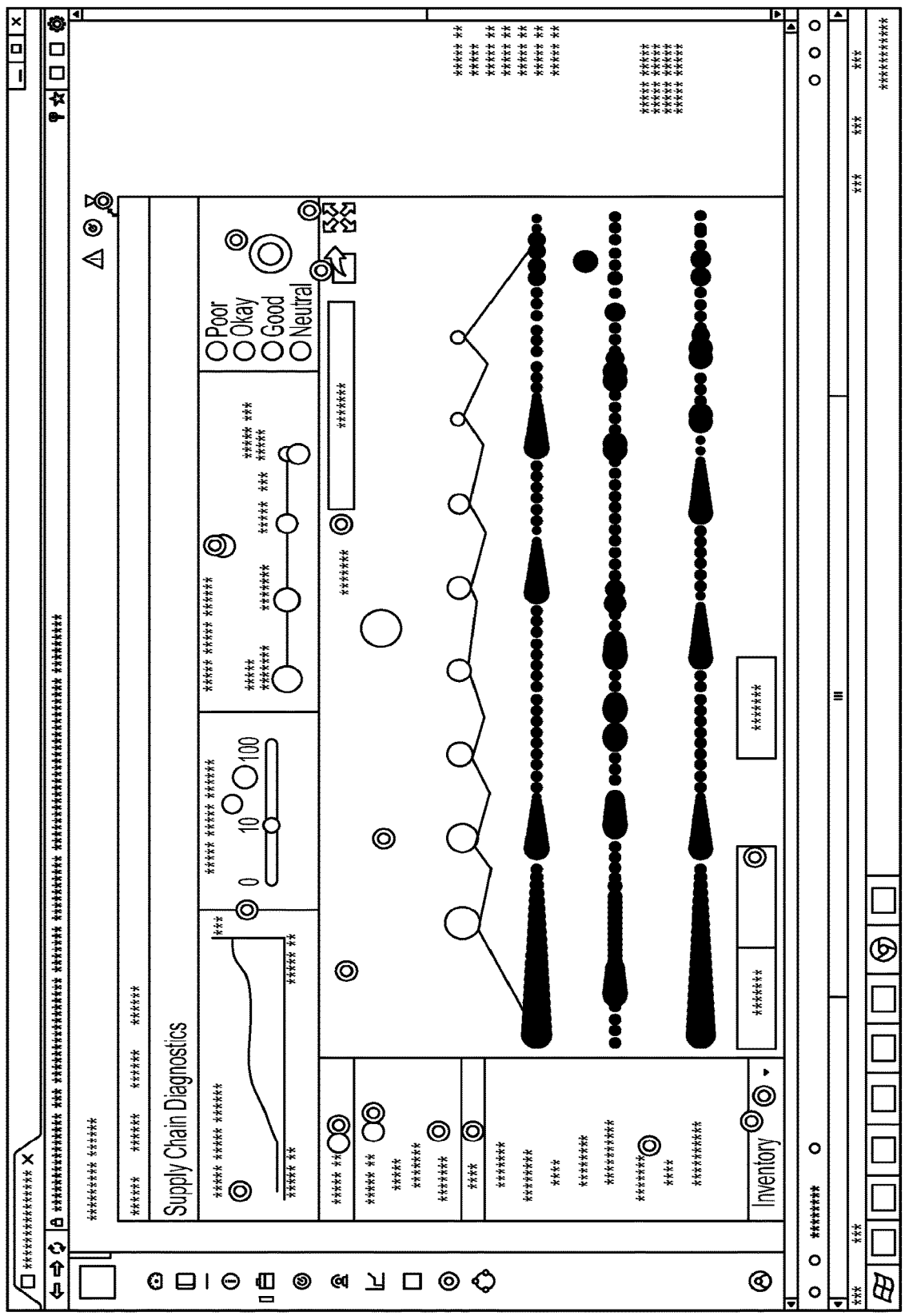
FIG. 18 illustrates an exemplary interface.

FIG. 18 illustrates a variety of supply chain diagnostics diagnosed and assessed by the analytics engine 1703. Of note, the supply chain may be displayed as a series of nodes, as discussed herein. The nodes may be selectable by the user, and may be hierarchically structured, such that only certain levels of the supply chain are displayed at a given time, as shown. Further, the engine 1703 may assess the data and vary the circle size, color, or the like, based on automatically assessed factors, such as revenue impact, node performance, node quantity, node geography, or the like, as discussed herein throughout.

Figure 19:
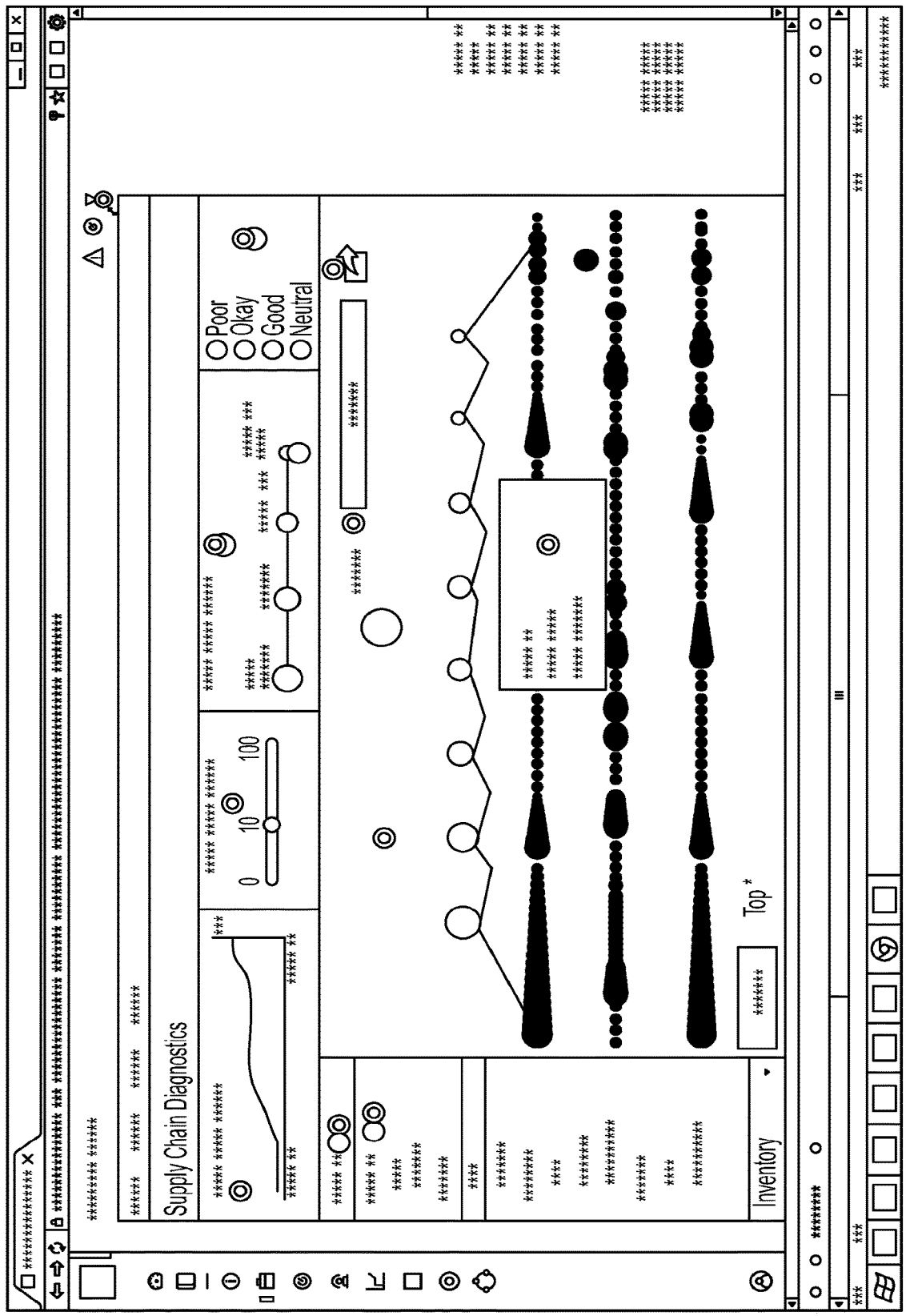
FIG. 19 illustrates an exemplary interface.

As more particularly illustrated in FIG. 19 and as referenced throughout, each node may be accessed in order to provide drill down information for that node. Needless to say, this drill down information may be, at least in part, stored at the node, and consequently the embodiments may improve real time network performance to obtain node-stored data. Any of various detailed attributes may be provided upon selection of detail, and the displayed attributes may be selectable by the user or may be automatically prioritized and accordingly displayed.

Figure 20:
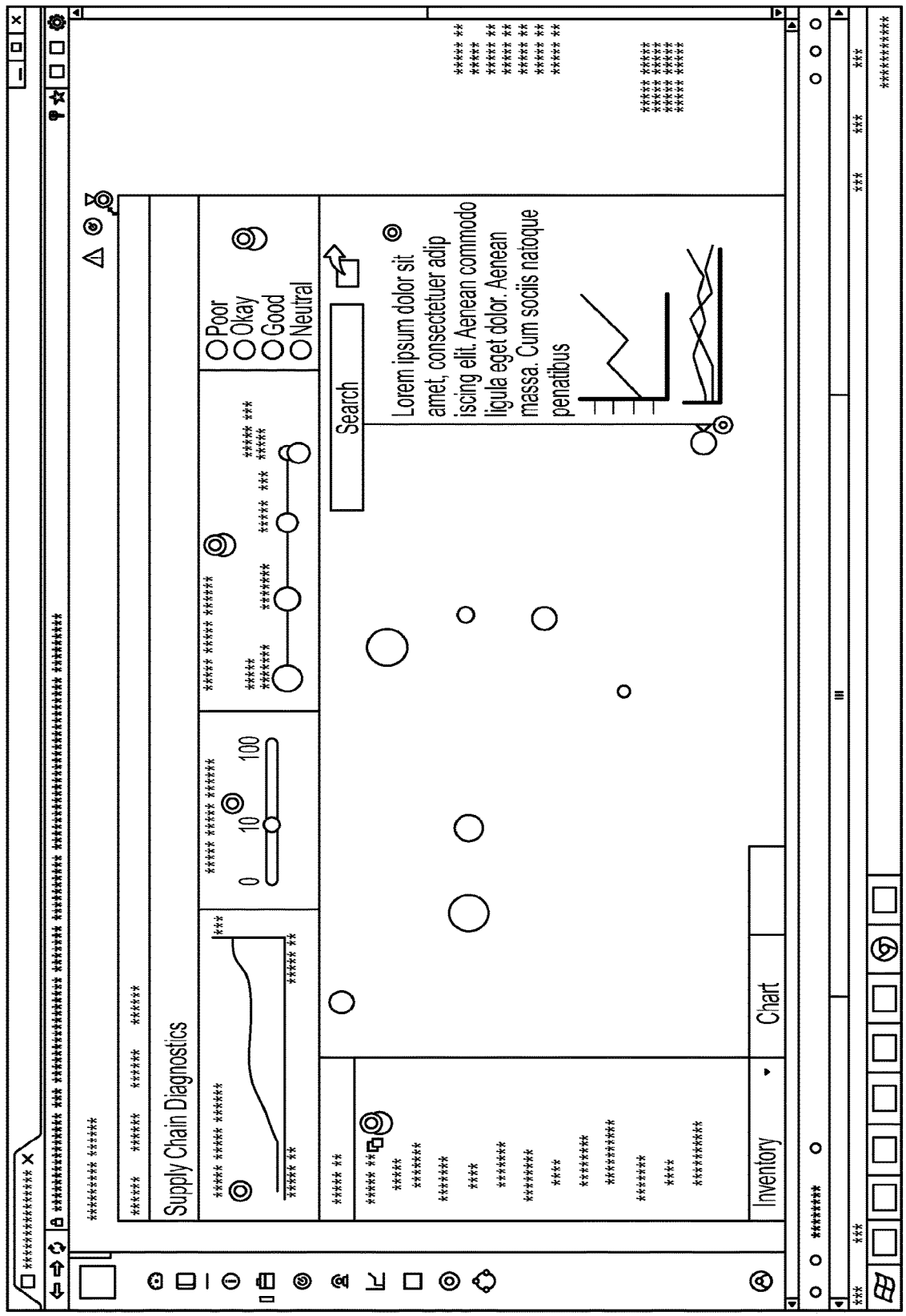
FIG. 20 illustrates an exemplary interface.

FIG. 20 illustrates with greater particularity, multilevel nodal detail. That is, child nodes of a principal node meeting certain criteria may be uniquely displayed upon selection, either based on automated criteria or by a user, of certain filtering aspects that indicate relevant or important nodes. Further, and as illustrated in FIG. 20, node detail or child node detail may include one or more widgets that may be auto populated with text, but which may variably present numeric values, graphical values, or the like, that are unique to the circumstance of that user, that product, that part, that geography, or the like. These widgets may be built, filled in, and/or otherwise executed based on decisions made by analytics engine 1703.

Figure 21:
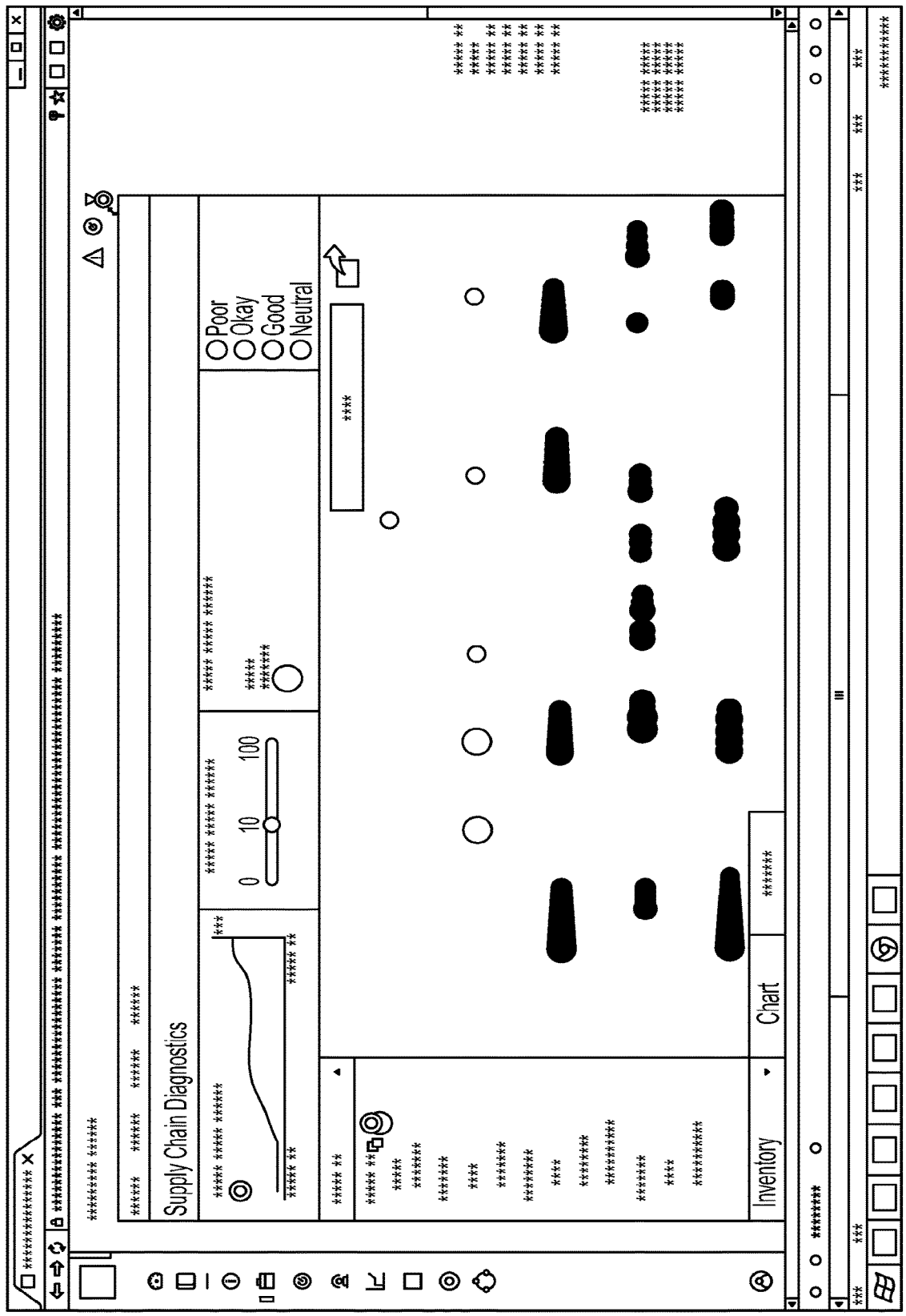
FIG. 21 illustrates an exemplary interface.

Node or hierarchical level filtering is illustrated with greater particularity in the exemplary embodiment of FIG. 21. As shown in FIG. 21, one or more filters may be automatically selected or may be selected by a user, such that only certain nodes meeting the criteria of the filter for the supply chain may be displayed. Needless to say, the detail on such nodes, once displayed responsive to filtering, may be available in embodiments such as those discussed above in FIGS. 18 and 19.

Figure 22:
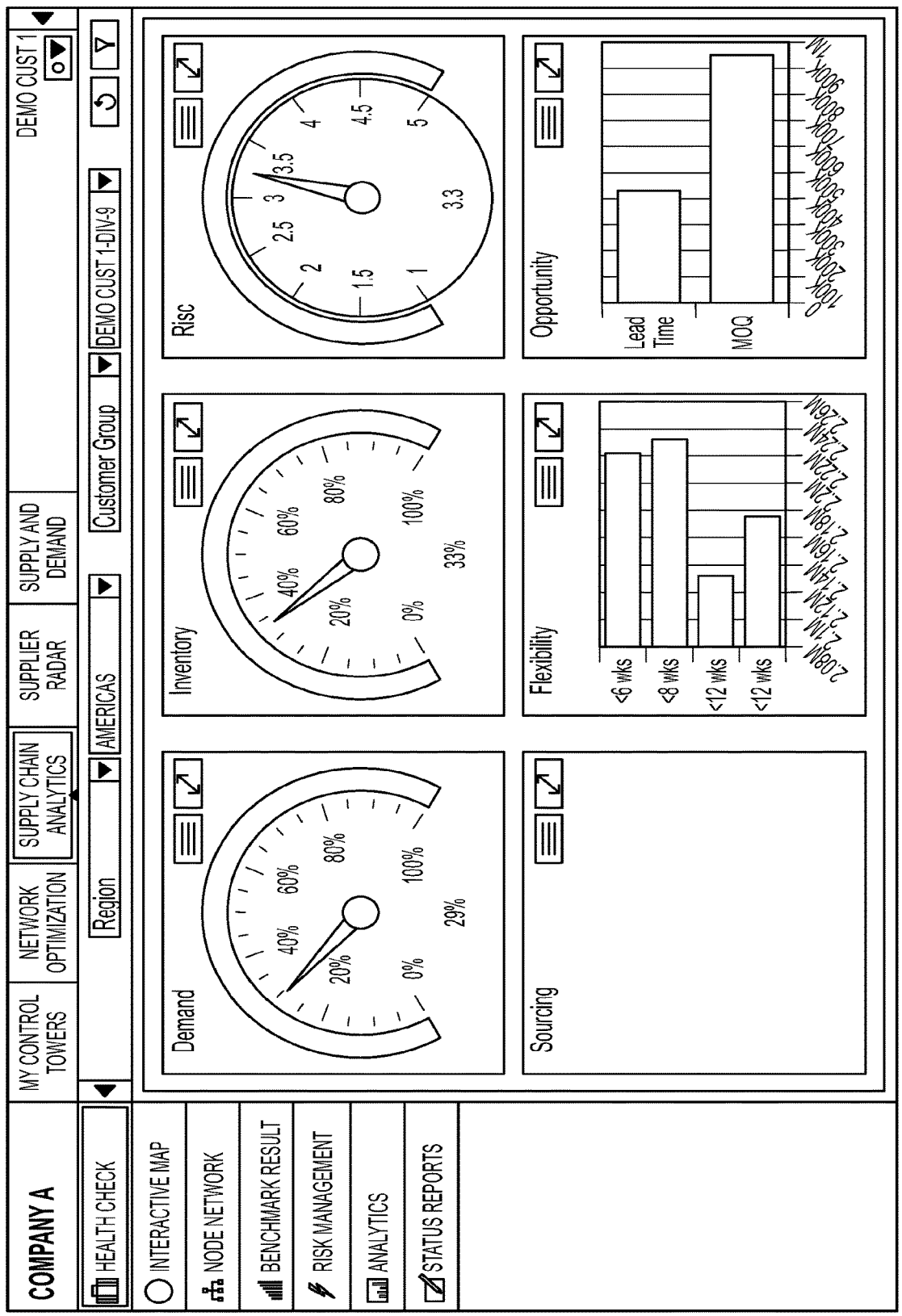
FIG. 22 illustrates an exemplary interface.

FIG. 22 illustrates an exemplary health check diagnostic screen that may be configured as part of a supply chain analytics engine 1703. As shown in the main content pane of FIG. 22, the system may be configured to process and visualize various data points as a dashboard, where, in this example, demand, inventory and risk attribute scoring are provided in a relative data format (29%, 33% and 3.3, respectively). Flexibility and opportunity processing and visualization is provided in the example as bar charts, indicating time/value determinations over a variety of predetermined time periods (<6 weeks, <8 weeks, <12 weeks, >12 weeks). Opportunity processing and visualization generates a bar chart indicating lead time, safety stock and MOQ valuations determined in the system. Sourcing options may also be provided to determine sourcing arrangements for the visualized output.

The health check diagnostic allows users to quickly assess the health of a customer supply chain over a plurality of key performance indicators (KPI). For demand, the demand KPI may focus on service level and/or delivery performance to a customer. The raw data may be processed via the platform and subsequently displayed in the dashboard to indicate a service level. For inventory, the inventory KPI may focus on the inventory position and breakdown. The dashboard indicator may display a proportion of excess and obsolete inventory versus a total inventory. For supply chain risk, the risk attribute KPI diagnostic displays a total supply chain risk score for a customer as discussed herein. A sourcing KPI may display a breakdown of BOM/parts/supplier ownership versus a customer. A flexibility KPI may display a proportion of total demand flowing through lead time thresholds. An opportunity KPI may display a breakdown of potential opportunities to improve flexibility or reduce cost in a supply chain.

Figure 23:
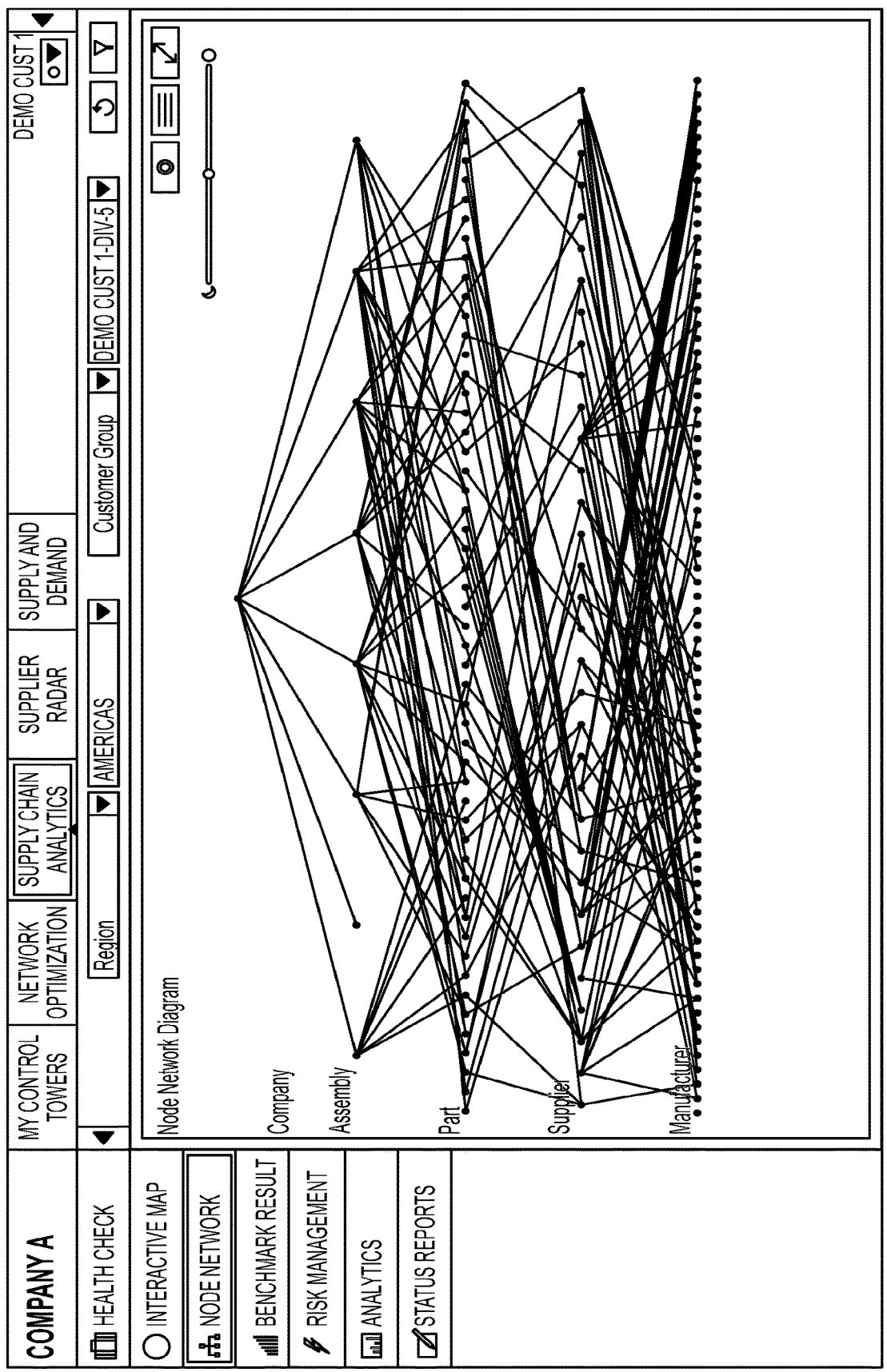
FIG. 23 illustrates an exemplary interface.
Figure 24:
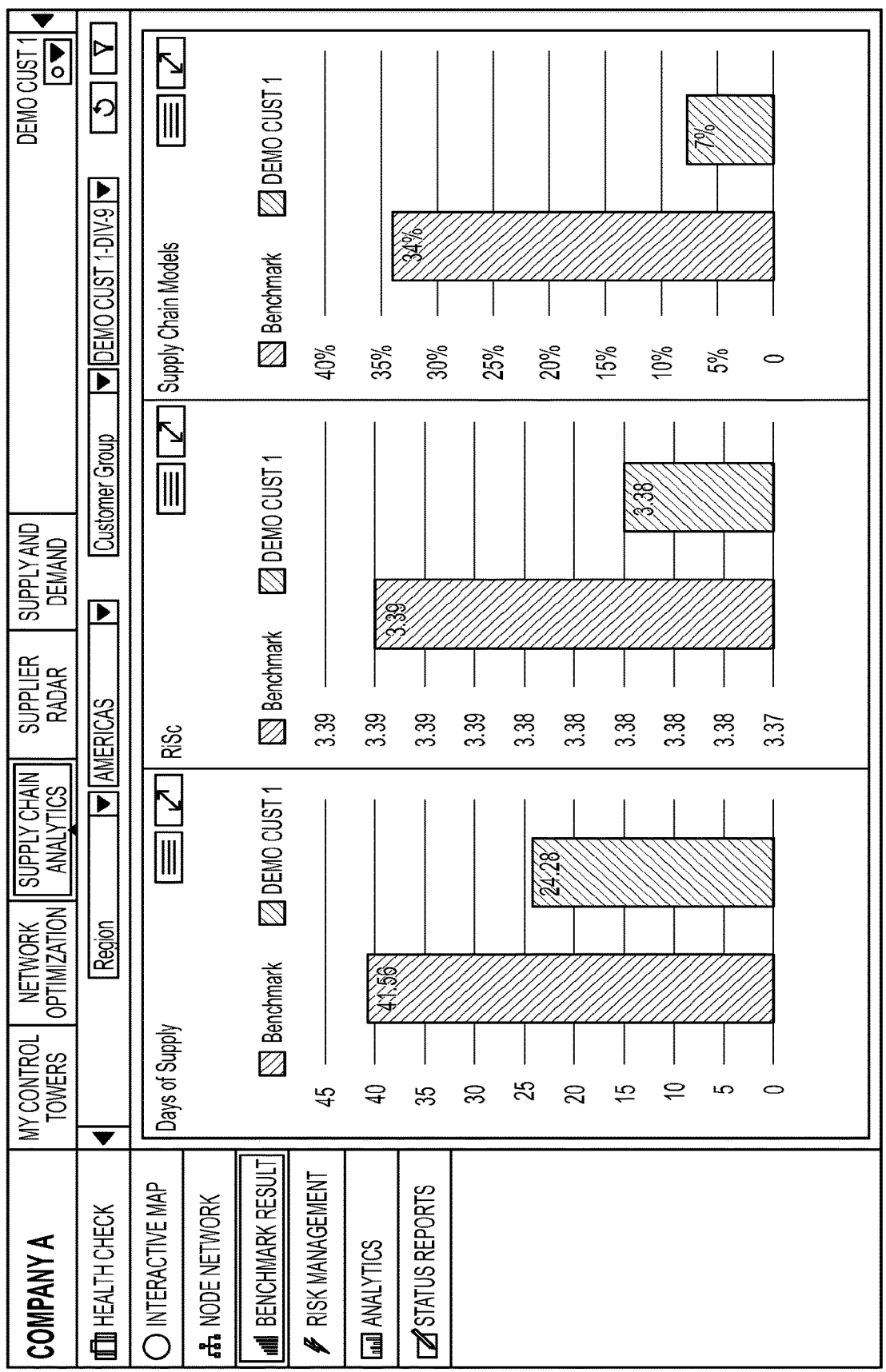
FIG. 24 illustrates an exemplary interface.

FIG. 23 illustrates an exemplary screenshot of a node network diagram, similar to those disclosed above. FIG. 24 illustrates an exemplary screenshot of benchmark results that advantageously allow users to access one or more reference points for supply chain metrics and may compare results against similar size and complexity customers in the system. Benchmarking may be performed using only that data accessible, pursuant to authorization, to that customer; using data across multiple clients of the manager of multiple customers; and/or using third party data, such as may be purchased from third parties at networked locations. Further, in the particular example of FIG. 24, days of supply, risk attribute score and supply chain model processing result benchmarks are presented (41.56, 3.39 and 34%, respectively) against similar benchmarks obtained from other customers ("DEMO CUST 1"), wherein it can be seen that the benchmarks are all above similarly-situated customers (24.28, 3.38 and 7%), thus indicating that potential issues may need to be addressed in the system.

Figure 25:
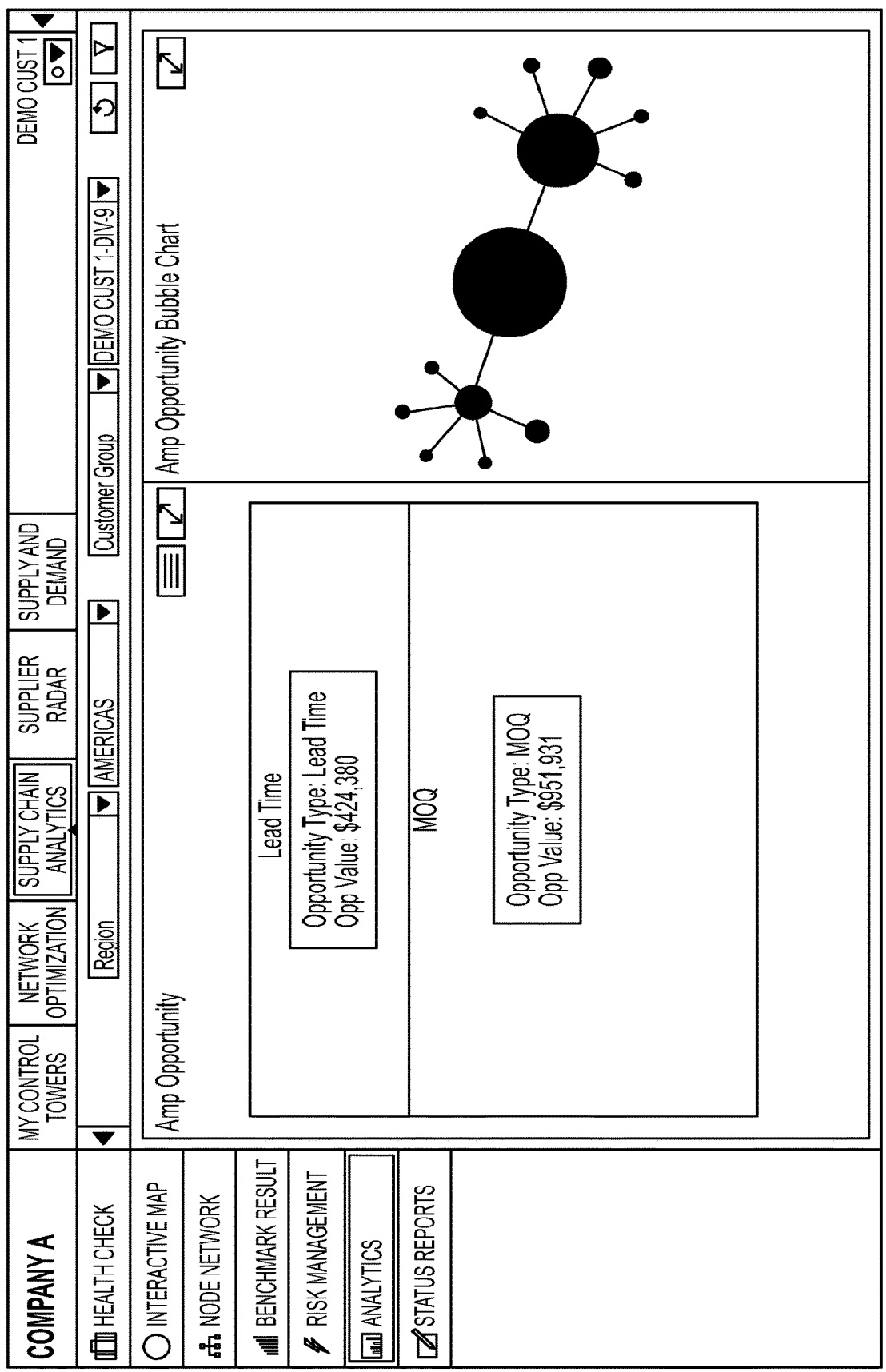
FIG. 25 illustrates an exemplary interface.

Turning to FIG. 25, an exemplary screen shot is provided for supply chain diagnostics which shows one example of processing and identifying supply chain opportunities. Here, an opportunity is defined in reference to a lead time and MOQ, where specific data points may be processed and presented for each attribute. The system may calculate and present a specific opportunity value for lead time supply chain attributes ($424,380), together with MOQ opportunity value ($951,931). As discussed above in connection with FIG. 7, an opportunity bubble chart may be simultaneously presented, containing the same and/or related attributes (lead time, MOQ), for further analysis. As discussed above, the individual bubbles of the bubble chart may be selected/rearranged to present alternate and/or additional opportunity values, which may be automatically recalculated and presented in the lead time and MOQ boxes shown in FIG. 25.

FIG. 26 illustrates geographic risk attribute diagnostics filtered by manufacturer. In the example of FIG. 26 an exemplary geographical impact report is illustrated, showing impacts of manufacturers at given locations based on revenue and spend. The geographical impact report advantageously allows users to process revenue impact and spend by supplier and/or geographic location. Such information may be very useful in times of supply chain disruptions.

The exemplary embodiments discussed herein, by virtue of the processing and networked nature of platform 307 and its associated apps, may provide typical data services, in conjunction with the specific features discussed herein. By way of non-limiting example, reports may be made available, such as for download, and data outputs in various formats/file types, and using various visualizations, may be available. Moreover, certain of the aspects discussed herein may be modified in mobile-device based embodiments, such as to ease processing needs and/or to fit modified displays.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A supply chain platform for providing diagnostics related to a supply chain comprising a plurality of supply chain nodes, comprising:
   a plurality of data inputs that receive primary hardware and software data from at least one second supply chain accessible over a computer network, wherein the data inputs comprise data hooks for one or more applications, that receive diagnostic data regarding at least one of the plurality of supply chain nodes, that receive social media feeds, and that receive information on parts supplied by ones of the plurality of supply chain nodes, which parts have characteristics reflected in the social media feeds, upon indication by at least one processor, wherein the parts are associated with a category for determining a frequency of procurement;
   a plurality of rules stored in at least one memory element associated with the at least one processor that compare the primary hardware data, the software data, the information on the parts, and the diagnostic data to produce secondary data upon direction from the at least one processor; and
   a plurality of data outputs that are based on visualization rules for the one or more applications and configured to:
   provide the secondary data to a user interface, the secondary data comprising at least a comparative optimization of the at least one of the plurality of supply chain nodes to predictively address risk of potential disruptions in the supply chain based on the comparison by at least ones of the plurality of rules of the supply chain and historic ones of the primary hardware and software data of the second supply chain, the secondary data also including at least a parts stock buffer for ones of the parts from one of the plurality of supply chain nodes, the part stock buffer being responsive particularly to at least the social media feeds which indicate at least a negating of a prior assumption about a natural disaster or catastrophic event, wherein the user interface is configured to display the secondary data as selectable graphical node icons organized in a first hierarchy of upstream node icons and downstream node icons corresponding to the plurality of supply chain nodes, and wherein, in response to receiving a selection of the graphical node icon, the at least one processor is configured to display on the user interface a second hierarchy of upstream node icons and downstream node icons corresponding to the selected graphical node icon.

2. The supply chain platform of claim 1, wherein the secondary data relates only to selected ones of the plurality of nodes.

3. The supply chain platform of claim 1, wherein the secondary data relates to all of the plurality of nodes in the supply chain.

4. The supply chain platform of claim 1, wherein the secondary data relates to ones of the plurality of supply chain nodes other than a node of the user.

5. The supply chain platform of claim 1, wherein the secondary data is provided to the user interface as a software as a service.

6. The supply chain platform of claim 5, wherein the software as a service is subject to a subscription fee.

7. The supply chain platform of claim 5, wherein the software as a service is subject to administrative limitations.

8. The supply chain platform of claim 1, wherein the diagnostics comprise a primary comparison to a successful second supply chain.

9. The supply chain platform of claim 8, wherein the primary comparison diagnoses the flaws or inadequacies of the nodes of the supply chain.

10. The supply chain platform of claim 9, wherein the flaws comprise likelihood of failure.

11. The supply chain platform of claim 1, wherein the secondary data provides for collaboration across ones of the plurality of nodes.

12. The supply chain platform of claim 1, wherein the secondary data comprises an action trigger for corrective action in the supply chain.

13. The supply chain platform of claim 1, wherein the diagnostic data relates solely to automated aspects of the supply chain.

14. The supply chain platform of claim 1, wherein the diagnostics data relates to optimization of computing resources.

15. The supply chain platform of claim 1, wherein the diagnostics data relates to optimization of networking of the plurality of nodes.

16. The supply chain platform of claim 1, wherein the first hierarchy comprises a tree node hierarchy of the plurality of supply chain nodes.

17. The supply chain platform of claim 16, wherein each node in the tree node hierarchy includes one-to-one, one-to-many and many-to-many connections to other nodes in the tree node hierarchy.

18. The supply chain platform of claim 1, wherein the procurement comprises a minimum order quantity.

19. The supply chain platform of claim 1, wherein the user interface comprises a bubble chart.

* * * * *